United States Patent [19]
Takano

[11] Patent Number: 5,648,879
[45] Date of Patent: Jul. 15, 1997

[54] METHOD OF AND APPARATUS FOR CONTROLLING THE PHASE OF A VIDEO SIGNAL

[75] Inventor: Akira Takano, Kanagawa, Japan

[73] Assignee: Sony Corporation, Tokyo, Japan

[21] Appl. No.: 553,932

[22] Filed: Nov. 6, 1995

[30] Foreign Application Priority Data

Nov. 7, 1994 [JP] Japan .................................. 6-272526

[51] Int. Cl.$^6$ .................................................. G11B 15/52
[52] U.S. Cl. ................................. 360/73.11; 386/81
[58] Field of Search .......................... 360/73.11, 73.12, 360/77, 12, 77.13, 77.14, 77.15, 77.16, 77.17, 10.2, 10.3, 13, 14.1; 386/68, 81, 69, 73

[56] References Cited

U.S. PATENT DOCUMENTS

| | | | |
|---|---|---|---|
| 4,811,130 | 3/1989 | Takayama | 360/73.11 |
| 5,438,458 | 8/1995 | Honjo | 360/77.12 X |
| 5,523,895 | 6/1996 | Takayama | 360/10.3 X |
| 5,546,248 | 8/1996 | Sakakibara et al. | 360/77.14 X |

*Primary Examiner*—Aristotelis Psitos
*Assistant Examiner*—James T. Wilson
*Attorney, Agent, or Firm*—William S. Frommer; Alvin Sinderbrand

[57] ABSTRACT

An apparatus for controlling the phase of a video signal has a track information detector for extracting track pair number data allotted to every N tracks from a reproduced signal when a rotary head is locked in phase with a reference signal, an FG generator, an FG counter for counting pulses of a capstan motor frequency signal, and a microcomputer for producing shift quantity data representing a shift quantity by which the rotary head is to be shifted to a target phase lock position, based on a value indicated by the track pair number data and a value indicated by the count from the FG counter, and controlling a capstan motor based on the shift quantity data, and output signals from a speed detector and a phase detector. The apparatus is capable of preventing an asynchronous condition from occurring upon switching between internal and external signals in an A/B editing process or the like.

12 Claims, 16 Drawing Sheets

| A-ch | Read Timing | Evaluation Based on Reference Playback Phase | | | | | Remarks |
|---|---|---|---|---|---|---|---|
| Head Phase Lock Position | | L1 | L2 | L3 | L4 | L5 | |
| L1 | | OK / NG | OK | OK | OK | OK | Reading Process Fixed |
| L2 | | NG | OK / NG | OK | OK | OK | Reading Process Fixed |
| L3 | | NG | NG | OK / NG | OK | OK | Reading Process Fixed |
| L4 | | NG | NG | NG | OK / NG | OK | Reading Process Fixed |
| L5 | | NG | NG | NG | NG | OK / NG | Reading Process Fixed |

Wp
Rp1(NG)
Rp2(NG)
LP 5,648,879

METHOD OF AND APPARATUS FOR CONTROLLING THE PHASE OF A VIDEO SIGNAL

BACKGROUND OF THE INVENTION

1. Field of the Invention

The present invention relates to a method of and an apparatus for controlling the phase of a video signal in video tape recorders (VTR) which do not record a CTL signal on a magnetic tape or an editing system that employs such VTRs.

2. Description of the Related Art

One conventional editing system for selectively recording video signals from a plurality of video sources in a single video tape cassette is illustrated in FIG. 1 of the accompanying drawings. The editing system shown in FIG. 1 is of the simplest design among editing systems generally known as A/B roll editing systems.

The A/B roll editing system shown in FIG. 1 comprises a console 106 having a liquid-crystal display (LCD) unit for displaying a time code and various control keys including a mix/wipe key, a playback key, a record key, a stop key, a fast-feed key, a rewind key, an edit start key, an edit end key, and other keys, a controller 104 for controlling various circuits in the editing system based on control information entered through the console 106 and a reference signal supplied from an external source through an input terminal 105, and for supplying the reference signal to the various circuits in the editing system, a playback VTR 100 for playing back a video tape cassette as an A roll, a playback VTR 101 for playing back a video tape cassette as a B roll, a switcher 102 for switching between an A-roll video signal Va from the playback VTR 100 and a B-roll video signal Vb from the playback VTR 101 based on a control signal from the controller 104, and a recording VTR 103 for recording an edited A/B-roll effect video signal which is produced by switching between the A-roll video signal Va and the B-roll video signal Vb with the switcher 102, in a video tape cassette used as a master tape.

In FIG. 1, the solid-line arrows extending from the controller 104 to the playback VTRs 100, 101, the switcher 102, and the recording VTR 103 represent the control signal, and the broken-line arrows extending from the controller 104 to the playback VTRs 100, 101, the switcher 102, and the recording VTR 103 represent the reference signal.

Operation of the A/B roll editing system shown in FIG. 1 will be described below with reference to FIG. 2 of the accompanying drawings. In FIG. 2, T represents the period of a frame, SYNC represents the reference signal indicated by the broken-line arrows in FIG. 1, Va represents the A-roll video signal from the playback VTR 100, Vb represents the B-roll video signal from the playback VTR 101, and Vab represents the A/B-roll effect video signal from the switcher 102.

When the control signal from the controller 104 is supplied to the playback VTR 100 and the playback VTR 101, the playback VTR 100 and the playback VTR 101 start playing back their respective video tape cassettes in synchronism with the reference signal SYNC. As shown in FIG. 2, the playback VTR 100 outputs A-roll video signals Va1, Va2, . . . , Va6 successively in respective periods T1, T2, . . . , T6, and the playback VTR 101 outputs B-roll video signals Vb1, Vb2, . . . , Vb6 successively in the respective periods T1, T2, . . . , T6.

These A- and B-roll video signals Va, Vb are supplied from the playback VTRs 100, 101 to the switcher 102. In response to the control signal from the controller 104, the switcher 102 selects and outputs the A-roll video signals Va1, Va2 in the respective periods T1, T2, outputs effect video signals Vab1, VaB2 produced by applying effects to the A-roll video signals Va3, Va4 and the B-roll video signals Vb3, Vb4 in the respective periods T3, T4, and selects and outputs the B-roll video signals Vb5, Vb6 in the respective periods T5, T6. The signals which are selected or given effects by the switcher 102 are outputted as the A/B-roll effect video signal Vab. The A/B-roll effect video signal Vab outputted from the switcher 102 is supplied to the recording VTR 103, which records the signal on the magnetic tape in the loaded video tape cassette along inclined tracks formed thereon.

Some A/B roll editing systems of the type described above have VTRs which employ magnetic tapes having widths of ½ inch, ¾ inch, and 1 inch. In such A/B roll editing systems, a tracking servo CTL (control pulse) signal recorded in a control track on a magnetic tape by a dedicated head when a video signal is recorded is reproduced, pulses of the reproduced CTL signal are counted to detect the present position on the magnetic tape, and processing such as phase control or the like is carried out based on the detected positional information.

Other A/B roll editing systems of the type described above have VTRs which employ magnetic tapes having widths of 8 mm, and those VTRs do not have a tracking servo system using the CTL signal, but incorporate an ATF (Automatic Track Finding) track servo system. According to the ATF track servo system, there are three methods available for detecting the present position on the magnetic tape.

According to the first method, the present position on the magnetic tape is determined by counting valleys or peaks of the envelope of a reproduced video signal (RF signal) supplied from a playback head.

However, the first method is disadvantageous in that if the envelope of a reproduced video signal is not obtained due to a dropout of the reproduced video signal or the like, the count of envelope valleys or peaks will be inaccurate, failing to produce accurate tape position information.

According to the second method, a time code representing tape position information is recorded in a PCMID area as a user area or a coding index area of PCM audio data recorded on a magnetic tape according to the 8-mm video tape format, and, when the magnetic tape is played back, the time code is read, and the tape position information is produced based on the time code that has been read.

The second method requires for its implementation a time code generator and a time code reader which add to the cost of the editing system. In addition, when the VTR operates in a variable-speed playback mode such as a search mode, since the head does not accurately scan a track on the magnetic tape where a PCM signal is recorded, e.g., obliquely scans two tracks on the magnetic tape, errors may be caused in reading the recorded time code, making it impossible to detect the present position on the magnetic tape with accuracy.

According to the third method, a capstan speed signal indicative of the detected rotational speed of a capstan motor or a reel speed signal indicative of the detected rotational speed of a reel motor is frequency-divided, and pulses of the frequency-divided signal are counted to detect the present position on the magnetic tape.

With the third method, inasmuch as the present position on the magnetic tape is not detected based on the video signal recorded on the magnetic tape, if the capstan slips against the magnetic tape or the magnetic tape is elongated or contracted due to aging or temperature changes, then the reproduced video signal tends to be brought out of phase with the frequency-divided signal produced from the capstan speed signal or the reel speed signal, resulting in a failure to detect the present position on the magnetic tape with accuracy.

The applicants have proposed a video signal reproducing apparatus which corrects the phase of pulses produced by frequency-dividing a capstan speed signal based on tape speed information that is obtained from an RF output signal and a switching pulse signal and phase information about the RF output signal and the switching pulse signal, for thereby generating a quasi-CTL signal which represents the accurate present position on the magnetic tape (see Japanese laid-open patent publication No. 2-292770).

In a VTR which uses a signal format that does not record a CTL signal on a magnetic tape, the proposed video signal reproducing apparatus corrects the phase of pulses produced by frequency-dividing a capstan speed signal based on tape speed information that is obtained from an RF output signal and a switching pulse signal and phase information about the RF output signal and the switching pulse signal, for thereby generating a quasi-CTL signal which represents the accurate present position on the magnetic tape. The quasi-CTL signal thus generated makes it possible to position the magnetic tape accurately for thereby effecting complicated tape editing.

The quasi-CTL signal generated in the manner described above is highly accurate. However, the RF signal which is employed in the generation of the quasi-CTL signal may suffer a low level of accuracy because of elongation or contraction of the magnetic tape due to aging or temperature changes, hitting engagement of a head with the magnetic tape at the time the head moves into abutment against the magnetic tape, the linearity of tracks on the magnetic tape, and guard band conditions. If the RF signal has a low level of accuracy, then the quasi-CTL signal is also low in its accuracy. Accordingly, tape position information or track position information which is obtained on the basis of the low-accuracy quasi-CTL signal is also low in its accuracy.

For example, if the playback VTR 100 fails to be locked in phase with the reference signal SYNC in an editing process on the A/B roll editing system shown in FIG. 1, then the A-roll video signal Va from the playback VTR 100 is out of phase with the reference signal SYNC, as shown in FIG. 3 of the accompanying drawings. As a result, the A-roll video signal Va2, immediately prior to the application of effects, of the A-roll video signal Va outputted from the switcher 102 is subject to a dropout.

For the above reasons, an editing process that employs a VTR which produces a quasi-CTL signal is liable to develop an asynchronous condition upon switching between a video signal from an external source and a video signal generated by the VTR, and is difficult to synchronize the tape transport in the VTR with an external synchronizing signal for outputting a reproduced signal accurately at intended times.

Problems with an editing process which is carried out in synchronism with an external synchronizing signal in a VTR which has no CTL head will be described below with reference to FIG. 4 of the accompanying drawings.

FIG. 4 shows the relationship between the timing of frame pulses Fp and drum switching pulses SWp and the processing timing of a playback system of a VTR which divides one frame of a video signal into ten tracks and records them on a magnetic tape.

The timing of frame pulses Fp and drum switching pulses SWp and the processing timing are illustrated in an upper portion of FIG. 4, and blocks of the playback system are illustrated in a lower portion of FIG. 4. The playback system includes a demodulator 43a, a time base corrector (TBC) 43b, an error correcting circuit 43c, a video decoder 43d, an audio decoder 43g, and D/A converters 43e, 43h.

In FIG. 4, L1, L2, . . . , L5 represent lock positions, de1 represents a processing time from the time when data recorded on a magnetic tape 28 by an A head 26p or a B head 27p is reproduced until the reproduced time is demodulated by the demodulator 43a and supplied to the TBC 43b, de2 represents a processing time from the time when the reproduced data is supplied to the TBC 43b until it is outputted from the TBC 43b, and de3 represents a processing time from the time when the reproduced data is outputted from the TBC 43b, and then processed by the error correcting circuit 43c, decoded by the video and audio decoders 43d, 43g, converted into analog video and audio signals by the D/A converters 43e, 43h, until the analog video and audio signals are outputted from respective output terminals 44, 45. The video signal outputted from the output terminal 44 is represented by Pout. In the example shown in FIG. 4, as can be seen from the solid-line arrow which indicates the video signal Pout from the time of the lock position L4, the video signal reproduced by the A head 26p or the B head 27p at the time of the lock position L4 is outputted at the position of a frame pulse Fp at a time T0 (reference playback phase).

The processing times (delay times) de1, de3 are fixed, and the processing time (delay time) de2 is variable.

In order for a desired video signal (and also the audio signal) Pout to be outputted at the time T0, the following equation has to be satisfied:

$$\text{The time at which the playback head traces the position on the magnetic tape where the desired video signal is recorded} = \text{the time T0} - \text{the processing time de1} - \text{the processing time de2} - \text{the processing time de3}. \quad (1)$$

From the equation (1) can be derived the following equation (2):

$$\text{The time at which the playback head traces the position on the magnetic tape where the desired video signal is recorded} + \text{processing time de2} = \text{the time T0} - \text{the processing time de1} - \text{the processing time de3}. \quad (2)$$

Therefore, if the lock position of the A head 26p or the B head 27p is changed, then in order for the video signal to be outputted at the time T0, the variable processing time de2 is adjusted because the processing times de1, de3 are fixed.

For example, if the A head 26p or the B head 27p is locked in the lock position L1, then the TBC 43b keeps a processing time de2 corresponding to three tracks, i.e., three switching pulses SWp, for outputting the reproduced data at the time T0. The three tracks referred to above mean three tracks for the A head 26p and three tracks for the B head 27p. If, however, the TBC 43b keeps a processing time de2 corresponding to two tracks, then the reproduced data is outputted one track prior to the time T0.

If the A head 26p or the B head 27p is locked in the lock position L5, then the TBC 43b is required to maintain the processing time de2 as it is or adjust it for one period. As a consequence, the reproduced data of a preceding frame is outputted at the time T0.

SUMMARY OF THE INVENTION

It is therefore an object of the present invention to provide a method of and an apparatus for controlling the phase of a video signal by locking the phase at a desired position to prevent an asynchronous condition upon switching between the video signal and an external signal and to output a reproduced signal at a desired time in an editing process.

According to the present invention, there is provided a method of controlling the phase of a video signal in a playback apparatus or a recording/playback apparatus for reproducing a signal recorded on a magnetic tape with a rotary head and effecting a playback process on the reproduced signal, comprising the steps of counting pulses of a capstan motor frequency signal from a frequency generator which outputs a frequency signal depending on the rotation of a capstan motor for transporting the magnetic tape, in every N tracks, for producing group count data representing a count of groups each composed of N tracks, extracting group number data allotted to every N tracks from a reproduced signal which is produced when the signal recorded on the magnetic tape is reproduced by the rotary head when the rotary head is locked in phase with a reference signal, producing shift quantity data representative of a shift quantity by which the rotary head is to be shifted to a target phase lock position with respect to the magnetic tape, based on a value indicated by the group count data and a value indicated by the group number data, generating a capstan motor drive signal for energizing the capstan motor to rotate at a speed depending on a value indicated by the shift quantity data, supplying the capstan motor drive signal to the capstan motor and detecting whether the number of pulses of the capstan motor frequency signal from the frequency generator falls within a target value or not, and supplying a capstan motor frequency signal representing a standard speed to the capstan motor if the number of pulses of the capstan motor frequency signal falls within the target value.

DETAILED DESCRIPTION OF THE PREFERRED EMBODIMENTS

First through fourth embodiments of the present invention will be described below under the following headings:

1ST EMBODIMENT

Figure 5:
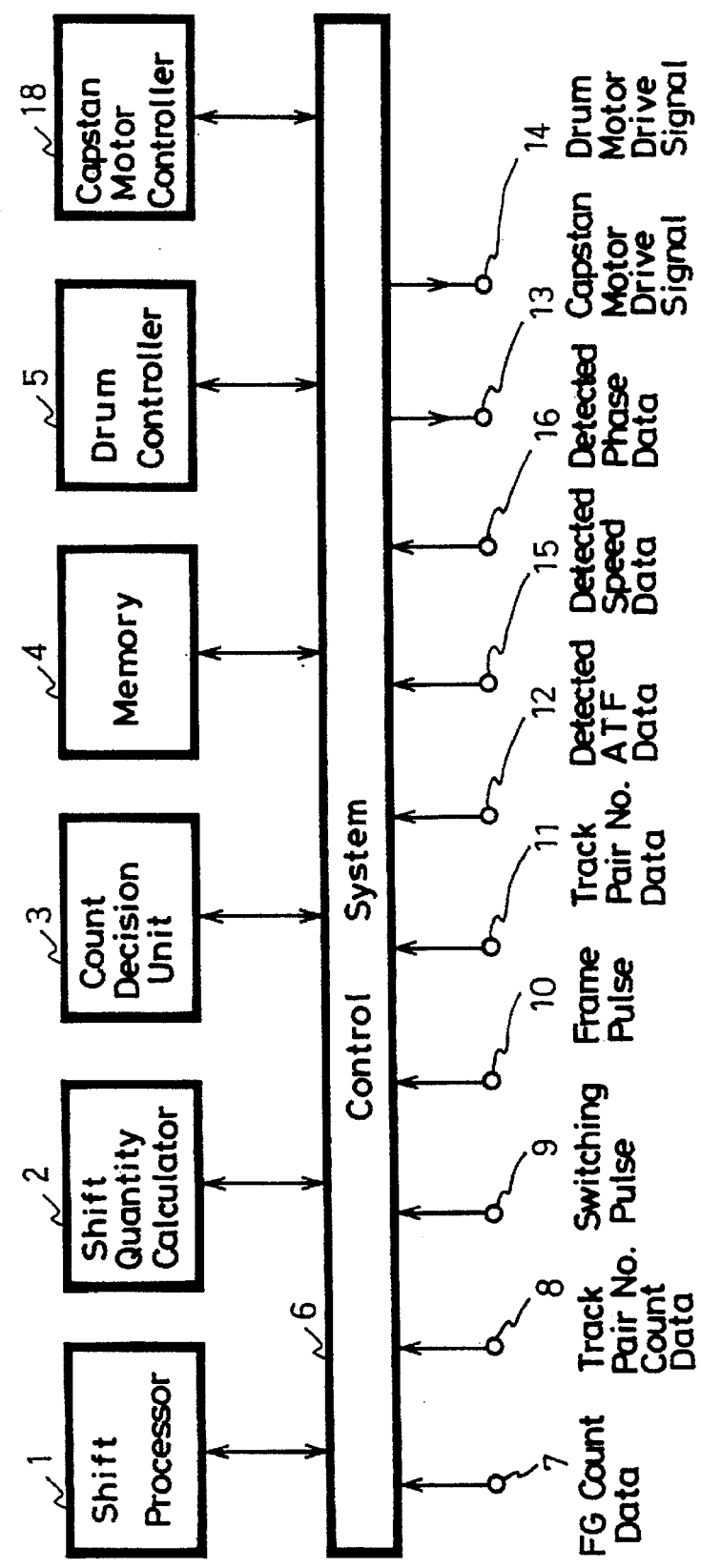
FIG. 5 is a block diagram of an apparatus for controlling the phase of a video signal according to a first embodiment of the present invention.
Figure 6:
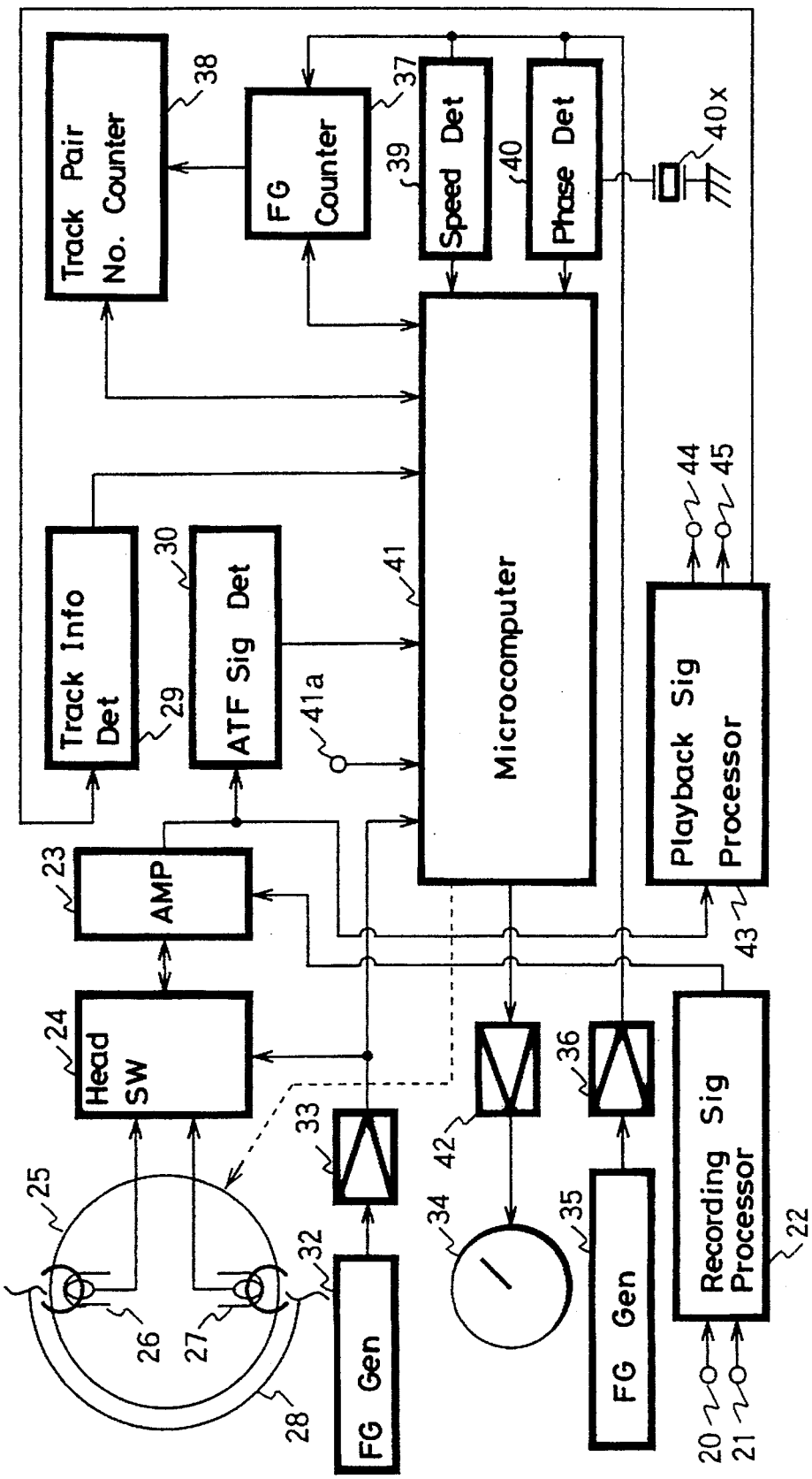
FIG. 6 is a block diagram of a VTR which incorporates the apparatus for controlling the phase of a video signal according to the first embodiment of the present invention.
Figure 7A:
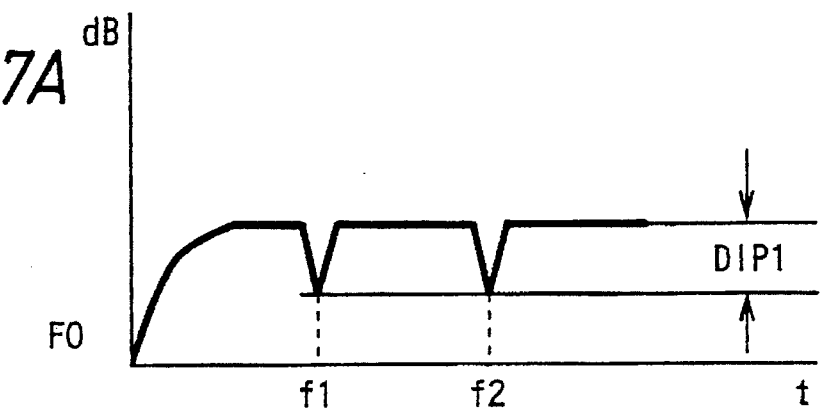
FIGS. 7A, 7B, and 7C are diagrams showing the frequency spectrums of tracking pilot signals in the apparatus for controlling the phase of a video signal according to the first embodiment of the present invention.
Figure 7B:
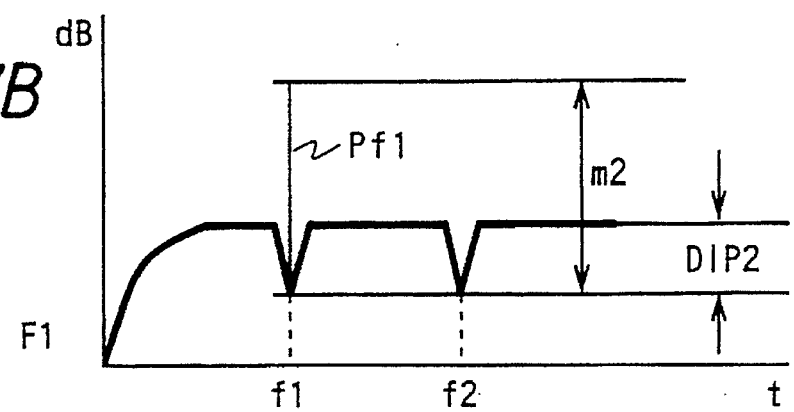
Figure 7C:
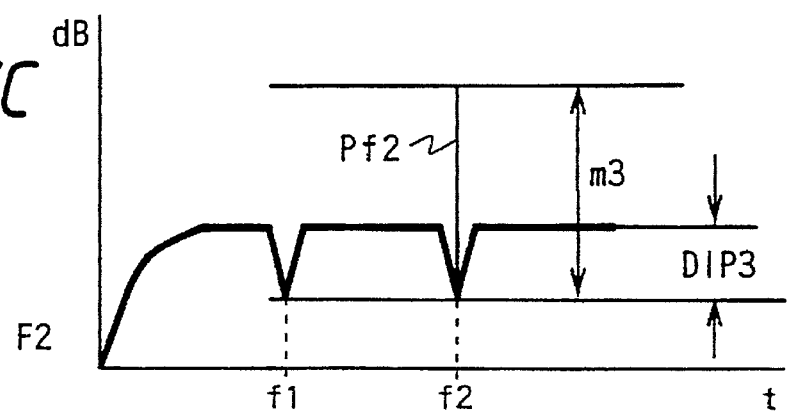
Figure 8:
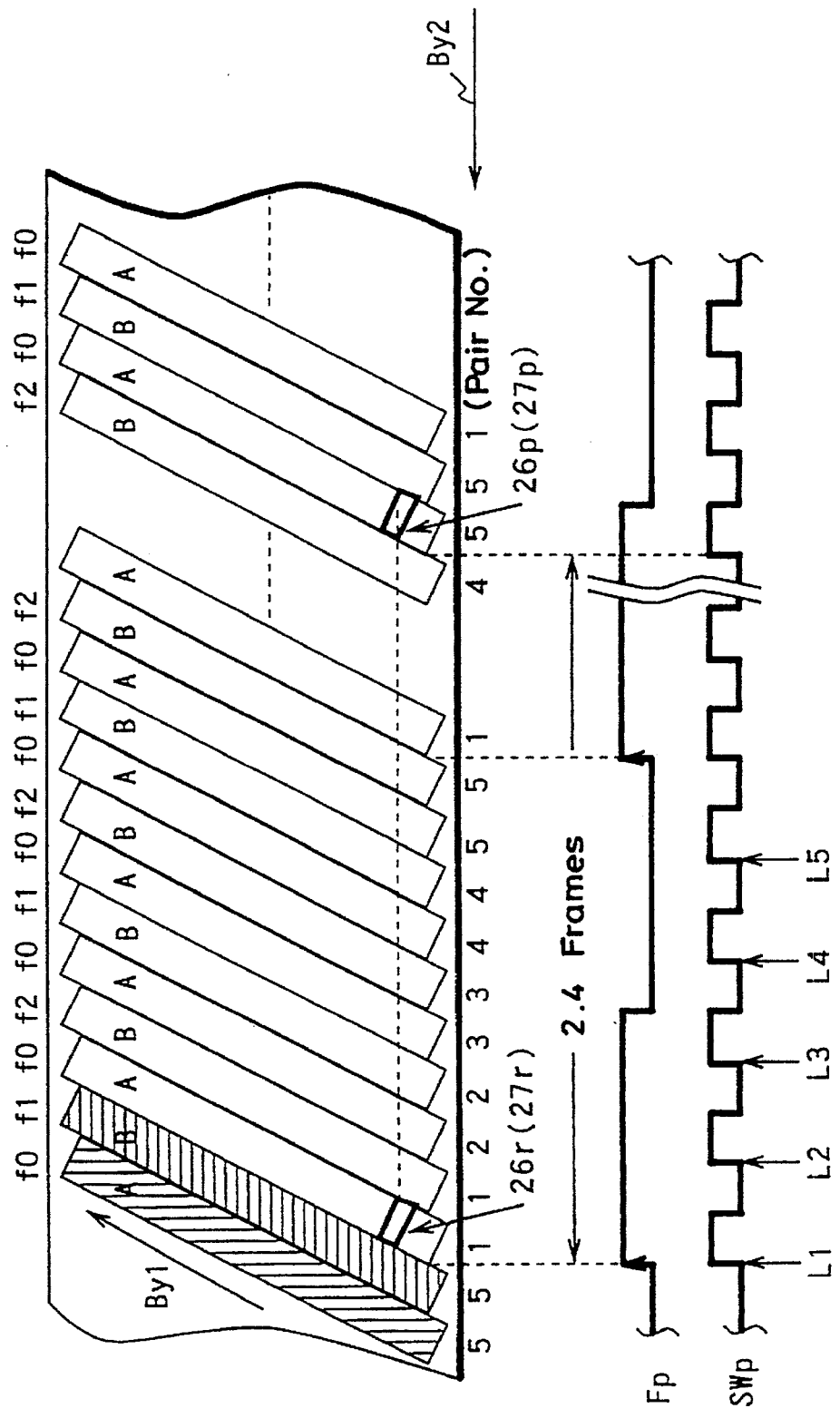
FIG. 8 is a diagram showing the relationship between a tape format and frame pulses and switching pulses in the apparatus for controlling the phase of a video signal according to the first embodiment of the present invention.
Figure 9:
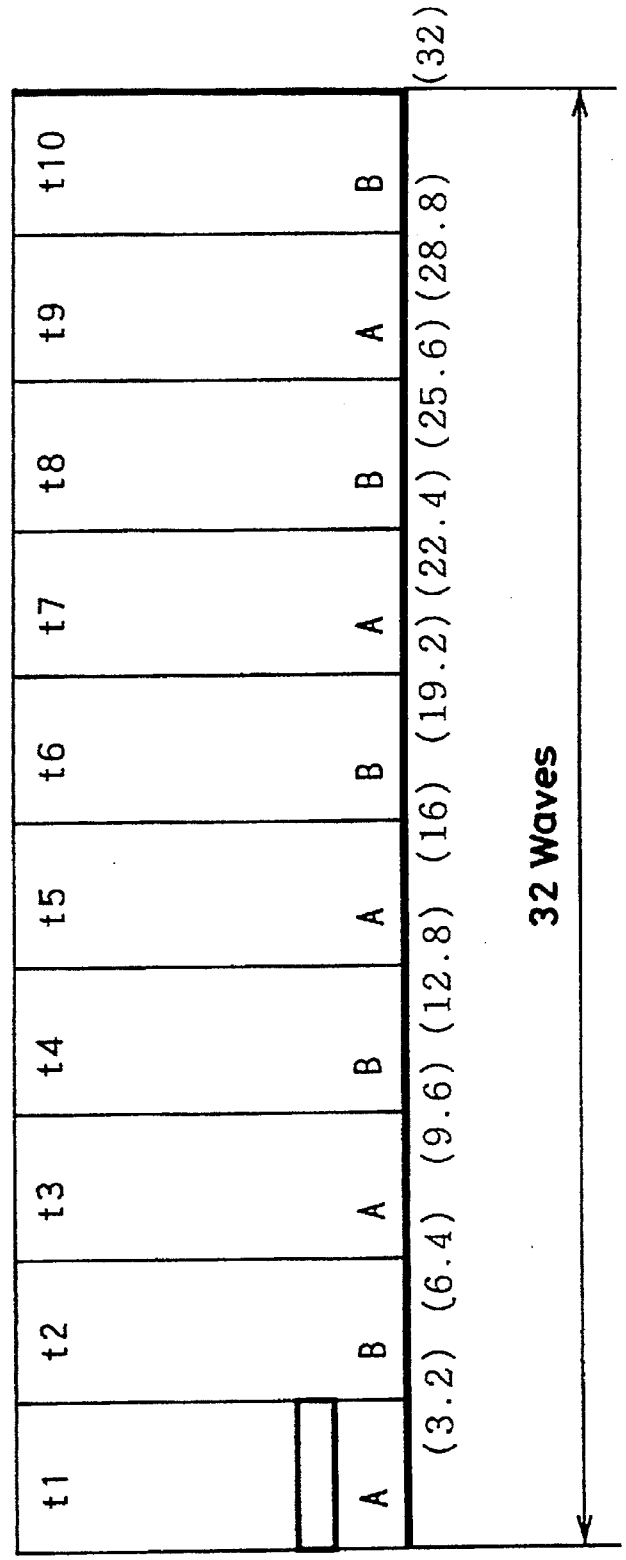
FIG. 9 is a diagram showing the relationship between a capstan frequency signal generated in one frame and tracks in one frame in the apparatus for controlling the phase of a video signal according to the first embodiment of the present invention.
Figure 10:
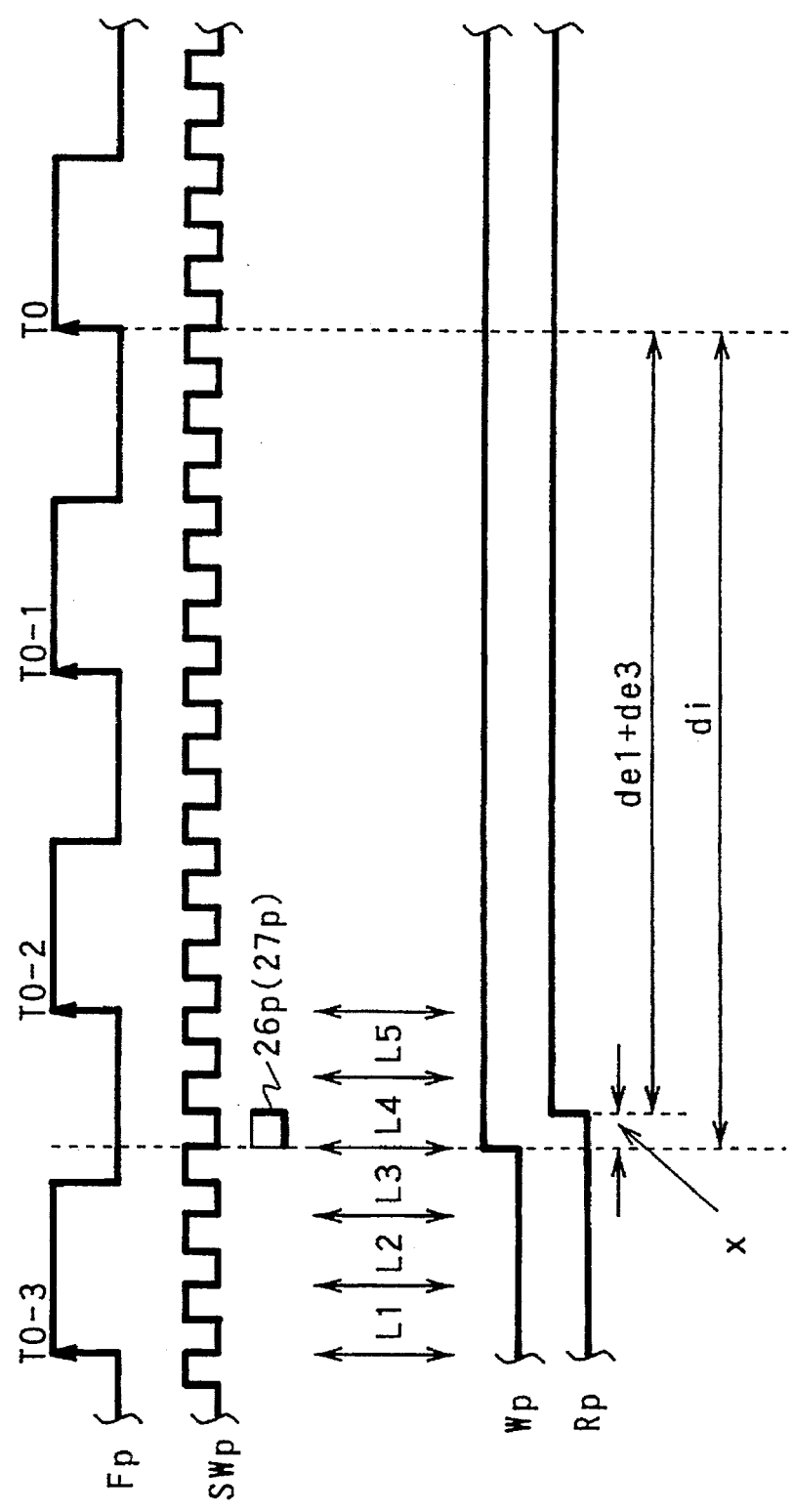
FIG. 10 is a diagram showing the relationship between the timing of frame pulses and switching pulses and the read and write timing in a TBC in the apparatus for controlling the phase of a video signal according to the first embodiment of the present invention.
Figure 11:
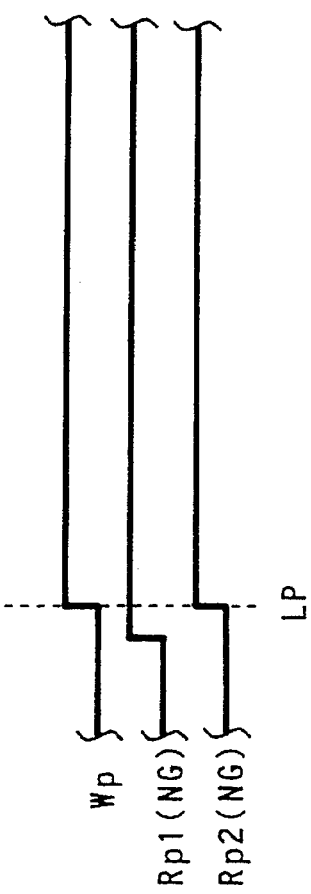
FIG. 11 is a diagram showing the relationship between head phase lock positions and the read timing in the apparatus for controlling the phase of a video signal according to the first embodiment of the present invention.
Figure 12:
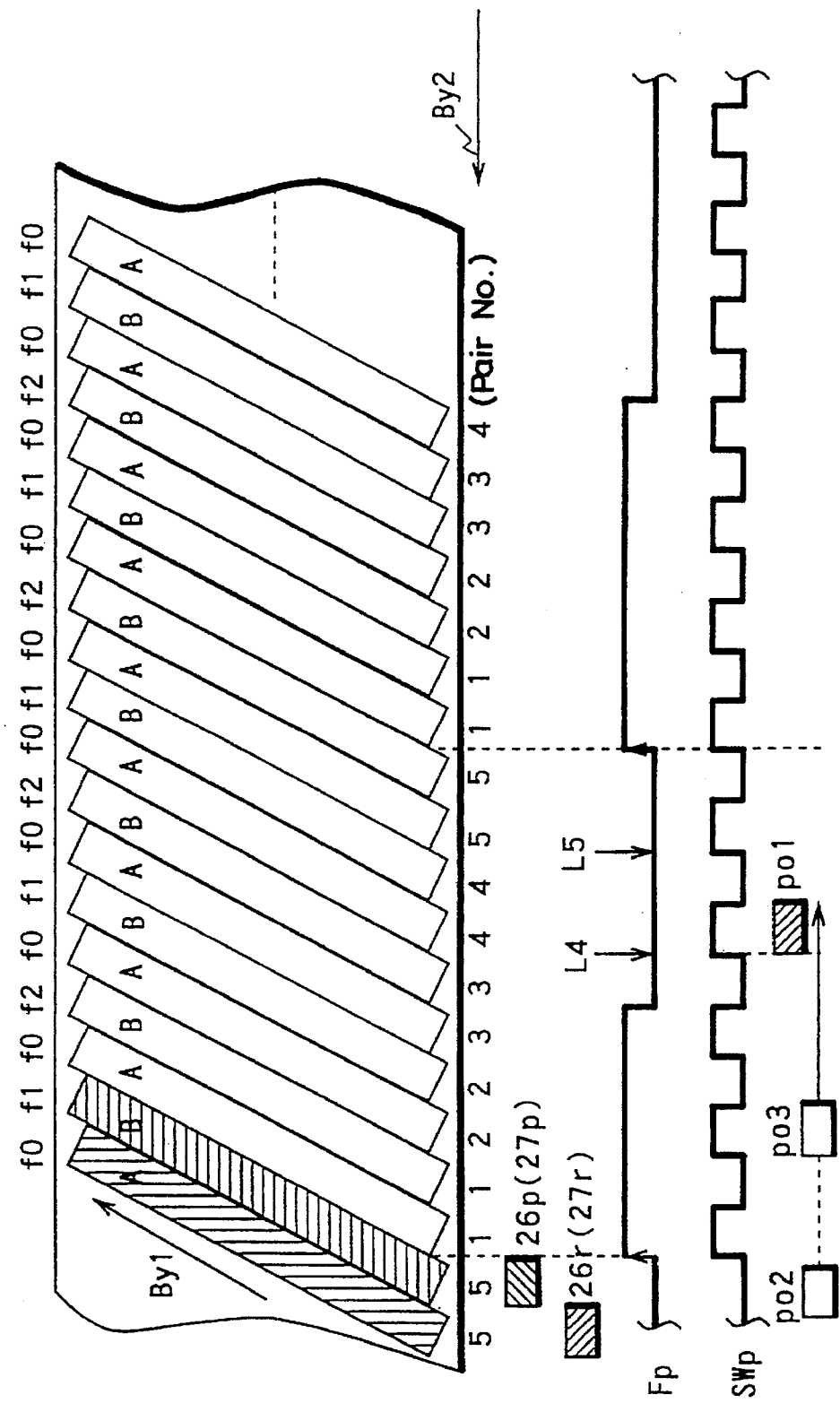
FIG. 12 is a diagram illustrative of use of track pair number data in a reading control process in the apparatus for controlling the phase of a video signal according to the first embodiment of the present invention.
Figure 13:
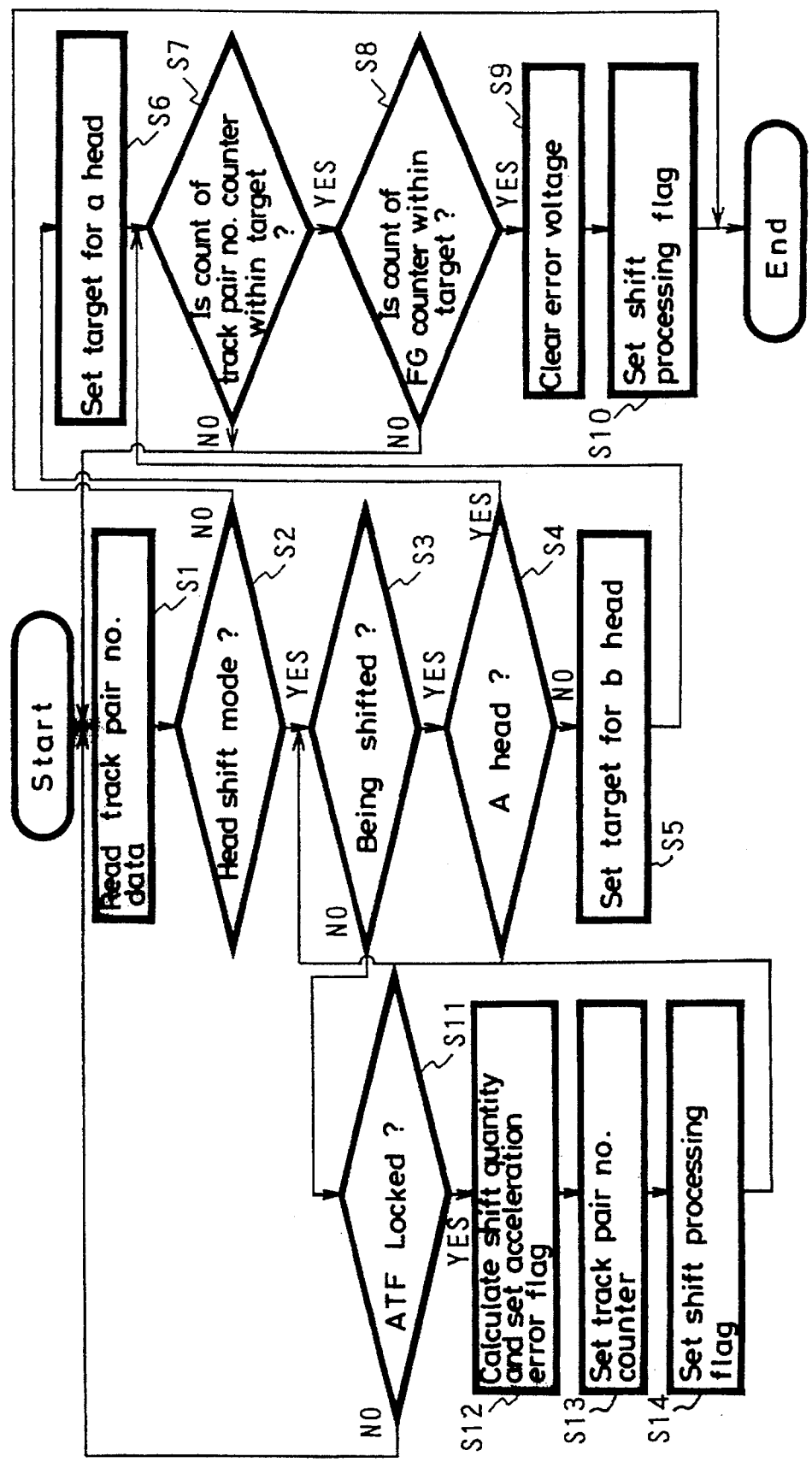
FIG. 13 is a flowchart of an operation sequence of the apparatus for controlling the phase of a video signal according to the first embodiment of the present invention.

A. Arrangement and operation of a VTR which incorporates an apparatus for controlling the phase of a video signal according to a first embodiment of the present invention (FIG. 6);

B. Tracking pilot signals (f0, f1, f2) (FIGS. 7A, 7B, and 7C);

C. Relationship between a tape format and frame pulses and switching pulses (FIG. 8);

D. Apparatus for controlling the phase of a video signal according to the first embodiment of the present invention (FIG. 5);

E. FG count data outputted from an FG counter in one frame (FIG. 9);

F. Relationship between the timing of frame pulses and switching pulses and the read and write timing in a TBC (FIG. 10);

G. Relationship between head phase lock positions and the read timing (FIG. 11);

H. Use of track pair number data in a reading control process (FIG. 12);

I. Operation sequence of the apparatus for controlling the phase of a video signal according to the first embodiment of the present invention (FIG. 13);

2ND EMBODIMENT

J. Time x from the positive-going edge of a read pulse to the positive-going edge of a write pulse is variable;

3RD EMBODIMENT

K. Phase control is effected upon recording;

4TH EMBODIMENT

Figure 14:
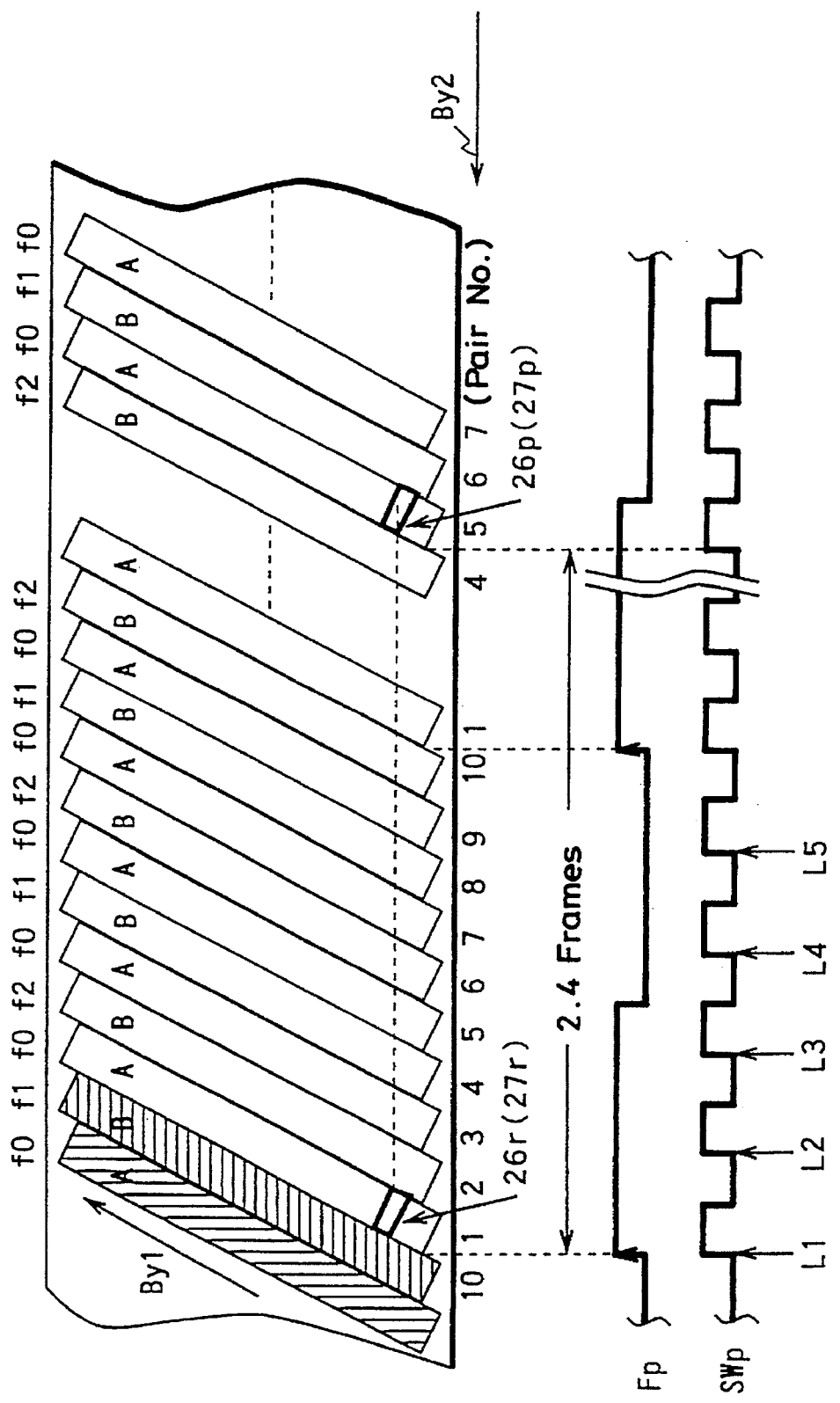
FIG. 14 is a diagram showing the relationship between a tape format and frame pulses and switching pulses in an apparatus for controlling the phase of a video signal according to a fourth first embodiment of the present invention.

L. Relationship between a tape format and frame pulses and switching pulses (FIG. 14);

M. Use of track pair number data in a reading control process (FIG. 15); and

Figure 16:
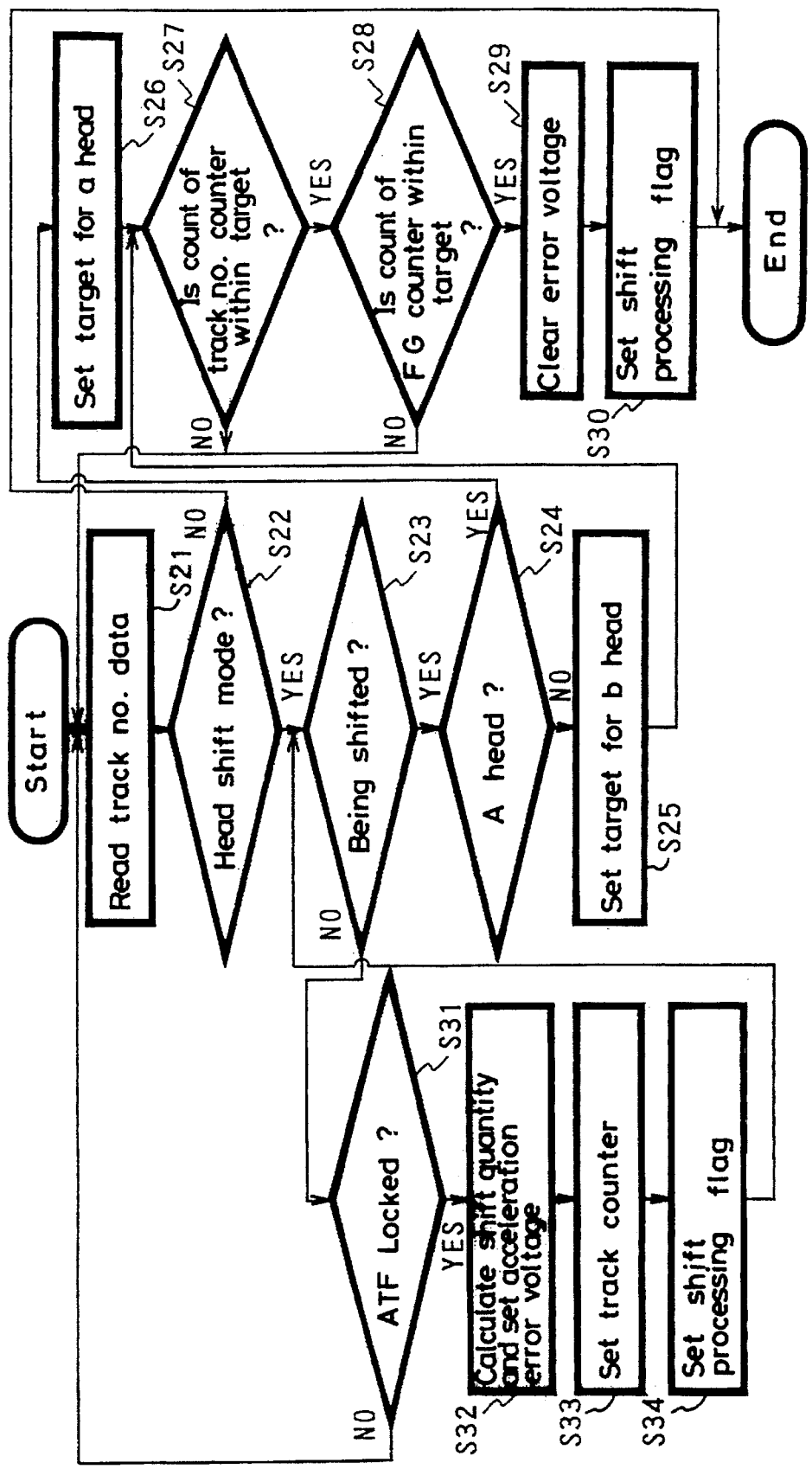
FIG. 16 is a flowchart of an operation sequence of the apparatus for controlling the phase of a video signal according to the fourth embodiment of the present invention.

N. Operation sequence of the apparatus for controlling the phase of a video signal according to the fourth embodiment of the present invention (FIG. 16).

BRIEF DESCRIPTION OF THE FIRST EMBODIMENT

According to the first embodiment, in the processing of a time base corrector in a playback signal processor 43 (see FIG. 6) in a VTR, a time x from the positive-going edge of a write pulse to the positive-going edge of a read pulse is set to a fixed value in view of the time of a playback process other than the processing time in the time base corrector. Pulses of a capstan motor frequency signal generated by an FG generator 35 in response to rotation of a capstan motor 34 are counted by an FG counter 37, which produces FG count data. Track pair numbers are produced by a track pair number counter 38 which first increments its count with "6" of the FG count data and then increments its count with "7" of the FG count data. Track pair number data obtained by being reproduced when the phase is first locked is loaded into the track pair number counter 38. FG count data as a target value, i.e., shift quantity data, is determined based on the track pair number count data obtained by being counted and the track pair number data obtained by being reproduced, and a capstan motor drive signal is produced from error voltage data that is obtained based on the shift quantity data. The capstan motor drive signal is supplied to the capstan motor 34 to effect a shifting process. If the count of the track pair number counter 38 falls within the target value and the count of the FG count 37 also falls within the target value, then the error voltage data supplied to the capstan motor 34 is reset to supply a capstan motor drive signal for transporting the magnetic tape at a 10/10-multiplied speed to the capstan motor 34 for thereby setting the rotational speed of the capstan motor 34 to a normal rotational speed. In this embodiment, for outputting a reproduced signal at a desired time T0 in synchronism with frame pulses supplied from an external source, the above process is carried out in order to achieve the phase lock at a lock position L4 that precedes the desired time T0 by the time of 2.4 frames required by a playback process, and a first track of the signal to be reproduced from the lock position L4 is scanned by an A head 26 for thereby outputting the reproduced signal in phase with the frame pulses at the desired time T0. With this arrangement, even a VTR which has no CTL head is capable of preventing an asynchronous condition due to switching of video and audio signals in an A/B roll editing process, for example, and of outputting a reproduced signal from a desired time in an editing process.

A. Arrangement and operation of a VTR which incorporates an apparatus for controlling the phase of a video signal according to a first embodiment of the present invention (FIG. 6):

FIG. 6 shows in block form a VTR which incorporates the apparatus for controlling the phase of a video signal according to the first embodiment of the present invention.

CONNECTIONS AND ARRANGEMENT

In FIG. 6, the VTR has an input terminal 20 for being supplied with a video signal to be recorded, an input terminal 21 for being supplied with an audio signal to be recorded, and a recording signal processor 22 for processing video and audio signals that have been supplied through the input terminals 20, 21.

The recording signal processor 22 converts video and audio signals supplied through the input terminals 20, 21 into respective digital video and audio data with A/D converters, adds an external-symbol ECC (Error Correction Code) to and shuffles the video data, and also adds an external-symbol ECC to and shuffles the audio data. The recording signal processor 22 then mixes the video and audio data, a synchronizing signal, and ID data, adds an internal-symbol ECC to and effects channel decoding on the mixed data. The recording signal processor 22 generates tracking pilot signals of different frequencies with respect to respective tracks for detecting a tracking error, according to an ATF (Automatic Track Following) process, and converts the generated tracking pilot signals according to a 24-to-25 conversion process. The recording signal processor 22 then multiplexes the converted tracking pilot signals and the data to be recorded, and supplies the multiplexed output signal to an amplifier 23.

The tracking pilot signals include three tracking pilot signals f0, f1, f2, for example. The tracking pilot signal f1 has a frequency of 465 KHz, and the tracking pilot signal f2 has a frequency of 697 KHz.

For recording desired data, the amplifier 23 amplifies the output signal from the recording signal processor 22 to a recording level, and supplies the amplified output signal to a head switching circuit 24. The head switching circuit 24 effects switching on the output signal from the amplifier 23 based on drum switching pulses generated by an FG generator 32 and supplied through an amplifier 33, and successively supplies signals to be recorded to recording/playback heads 26, 27. The recording/playback heads 26, 27 now record the signals on a magnetic tape 28 along ten recording tracks with azimuths per frame, for example. The recording/playback head 26 will be referred to as an A head 26, and the recording/playback head 27 as a B head 27. When recording/playback heads 26, 27 are to be specified as recording and playback heads, the A head 26 will be referred to as an A head 26p as a playback head and an A head 26r as a recording head, and the B head 27 will be referred to as a B head 27p as a playback head and a B head 27r as a recording head.

When the data recorded on the magnetic tape 28 along helical tracks is reproduced by the A head 26 and the B head 27, RF signals generated by the A head 26 and the B head 27 are supplied to the head switching circuit 24. The head switching circuit 24 effects switching successively on the supplied RF signals based on the drum switching pulses, and supplies them to the amplifier 23. For reproducing recorded data, the amplifier 23 amplifies the RF signals supplied from the A head 26 and the B head 27, equalizes the RF signals with respect to waveform into reproduced data, and supplies the reproduced data to a playback signal processor 43 and an ATF signal detector 30.

The playback signal processor 43 processes the supplied reproduced data according to channel decoding, synchronization detection, and internal-symbol ECC decoding, then processes the video data according to deshuffling, external-symbol ECC decoding, and error concealing, and also processes the audio data according to deshuffling, external-symbol ECC decoding, and error concealing. The playback signal processor 43 then converts the video data into an analog video signal and outputs the analog video signal through an output terminal 44, and also converts the audio data into an analog audio signal and outputs the analog audio signal through an output terminal 45.

The playback signal processor 43 supplies the reproduced data processed according to the internal-symbol ECC decoding to a track information detector 29. The track information detector 29 extracts track pair number data in the ID data within the reproduced data supplied from the playback signal processor 43, and supplies the extracted track pair number data to a microcomputer 41.

The track pair number data is data recorded on the magnetic tape 28 as one item of data in the ID data within the sector of each track. In this embodiment, since the two heads, i.e., the A head 26 and the B head 27 are employed and they form two tracks, i.e., A and B tracks, on the magnetic tape 28 each time a rotary drum 25 makes one revolution, the A track formed on the magnetic tape 28 by the A head 26 when the rotary drum 25 makes one revolution and the B track formed on the magnetic tape 28 by the B head 27 when the rotary drum 25 makes one revolution are paired, and the same track pair number data is recorded in ID data for these A and B tracks.

The ATF signal detector 30 extracts tracking pilot signals recorded in tracks adjacent to a reproduced track within the reproduced data supplied from the amplifier 23, compares the levels of the extracted tracking pilot signals to detect whether the A head 26 or the B head 26 is accurately scanning the track, and supplies the detected ATF data to the microcomputer 41.

An FG counter 37 counts pulses of a capstan motor frequency signal (32 pulses or waves in one frame) which is supplied from an FG generator 35 through an amplifier 36, and generates FG count data ranging from "1" to "32" (which may be in the range from "0" to "31") in one frame. The FG counter 37 then supplies the FG count data to the microcomputer 41 and a track pair number counter 38. The FG generator 35 generates two capstan motor frequency signals which are 90° out of phase with each other upon rotation of a capstan motor 34. The two capstan motor frequency signals generated by the FG generator 35 are indicated by the single line in FIG. 6. The FG counter 37 is supplied with one of the two capstan motor frequency signals which leads the other in phase.

The capstan motor frequency signals are supplied to a speed detector 39 and a phase detector 40. The speed detector 39 detects the rotational speed of the capstan motor 34 using the two capstan motor frequency signals which are 90° out of phase with each other that are supplied from the FG generator 35. The phase detector 40 compares the phase of one of the two capstan motor frequency signals that are supplied from the FG generator 35, with the phase of a reference capstan motor frequency signal which is generated based on a clock signal of 3.58 MHz, for example, that is generated by an oscillator 40x, thereby generating detected phase data, i.e., a capstan error signal. The rotational speed data produced by the speed detector 39 and the detected phase data produced by the phase detector 40 are supplied to the microcomputer 41.

The microcomputer 41 generates error voltage data for energizing the capstan motor 34 to rotate at a desired speed, based on the rotational speed data supplied from the speed detector 39, the detected phase data supplied from the phase detector 40, the FG count data supplied from the FG counter 37, the track pair number data extracted from the reproduced signal and supplied from the track information detector 29, the detected ATF data supplied from the ATF signal detector 30, and the drum switching pulses supplied from the FG generator 32 through the amplifier 33, and outputs a capstan motor drive signal produced on the basis of the error voltage data. The capstan motor drive signal is supplied through an amplifier 42 to the capstan motor 34. If the detected ATF data indicates a phase locked condition, then the microcomputer 41 loads the read track pair number data into the track pair number counter 38.

The microcomputer 41 also generates a drum motor drive signal based on frame pulses, such as of an external reference synchronizing signal such as a gen-lock signal, supplied through an input terminal 41a, and the drum switching pulses SWp supplied from the FG generator 32 through the amplifier 33, and supplies the drum motor drive signal to energize a drum motor (not shown) coupled to the rotary drum 25 as indicated by the broken lines in FIG. 6. In an editing mode or the like, the microcomputer 41 synchronizes the drum switching pulses with frame pulses that are supplied from an external source through the input terminal 41a.

MODIFICATION

The FG counter 37, the track pair number counter 38, the speed detector 39, and the phase detector 40 may be either incorporated as hardware components in the microcomputer 41 or implemented by software programs stored in a ROM or the like.

RECORDING OPERATION

Video and audio signals are supplied through the input terminals 20, 21 to the recording signal processor 22. In the recording signal processor 22, the video and audio signals are converted into respective digital video and audio data by the A/D converters. The recording signal processor 22 also adds an external-symbol ECC to and shuffles the video data, and also adds an external-symbol ECC to and shuffles the audio data. The recording signal processor 22 then mixes the video and audio data, a synchronizing signal, and ID data including track pair number data, adds an internal-symbol ECC to and effects channel decoding on the mixed data. The recording signal processor 22 then multiplexes the processed data and tracking pilot signals that have been converted according to the 24-to-25 conversion process, and supplies the multiplexed data through the amplifier 23 to the head switching circuit 24.

The data supplied to the head switching circuit 24 is switched based on the drum switching pulses generated by the FG generator 32 and supplied through the amplifier 33, and successively supplied to the A head 26 or the B head 27. The data are recorded on the magnetic tape 28 along ten recording tracks with difference azimuths per frame by the A head 26 or the B head 27.

PLAYBACK OPERATION

The magnetic tape 28 is transported by a reel motor (not shown) and the capstan motor 34, and the rotary drum 25 is rotated by the non-illustrated drum motor, so that the magnetic tracks formed on the magnetic tape 28 are successively scanned by the A head 26 and the B head 27 which are mounted on the rotary drum 25.

RF signals reproduced from the magnetic tracks by the A head 26 and the B head 27 are supplied to the head switching circuit 24, which selectively supplies the RF signals to the amplifier 23 based on the drum switching pulses that are supplied from the FG generator 32 through the amplifier 33.

The RF signals supplied to the amplifier 23 are amplified and shaped in waveform, and thereafter supplied to the ATF signal detector 30 and the playback signal processor 43. The playback signal processor 43 processes the supplied reproduced RF data according to channel decoding, synchronization detection, and internal-symbol ECC decoding, then processes the video data according to deshuffling, external-symbol ECC decoding, and error concealing, and also processes the audio data according to deshuffling, external-symbol ECC decoding, and error concealing. The playback signal processor 43 then converts the video data into an analog video signal with a D/A converter and outputs the analog video signal through the output terminal 44, and also converts the audio data into an analog audio signal with a D/A converter and outputs the analog audio signal through the output terminal 45.

The reproduced data processed according to the internal-symbol ECC decoding is supplied to the track information detector 29. The track information detector 29 extracts track pair number data in the ID data within the reproduced data, and supplies the extracted track pair number data to the microcomputer 41.

The ATF signal detector 30 extracts tracking pilot signals from the reproduced RF data supplied from the amplifier 23, and detects levels of the extracted tracking pilot signals. The ATF signal detector 30 then supplies the detected ATF data to the microcomputer 41.

The FG counter 37 counts pulses (32 pulses per frame) of one of the two capstan motor frequency signals supplied from the FG generator 35 through the amplifier 36, and supplies FG count data to the microcomputer 41 and the track pair number counter 38. The track pair number counter 38 increments its count when the FG count data from the FG counter 37 represents "6", "13", "19", "26", and "32".

The two capstan motor frequency signals are supplied to the speed detector 39 and the phase detector 40. The speed detector 39 detects the rotational speed of the capstan motor 34 based on the two capstan motor frequency signals supplied from the FG generator 35 which are 90° out of phase with each other. The phase detector 40 detects the phase of one of the two capstan motor frequency signals supplied from the FG generator 35, in the manner described above.

The detected speed data produced by the speed detector 39 and the detected phase data produced by the phase detector 40 are supplied to the microcomputer 41. When the microcomputer 41 detects a phase locked condition based on the detected ATF data supplied thereto, the microcomputer 41 determines whether a head shift mode is selected or not based on a value indicated by the track pair number data from the track information detector 29 and the track pair number count data from the track pair number counter 38. If the head shift mode is selected, then the microcomputer 41 determines whether shift processing is being carried out or not. If the shift processing is being carried, then a first process is effected, and if the shift processing is not being carried, then a second process is effected.

In the first process, the microcomputer 41 determines whether a phase locked condition is achieved or not based on the detected ATF data from the ATF signal detector 30. If the phase locked condition is achieved, then the microcomputer 41 calculates a shift quantity from the track pair number data when the phase-locked position is other than a predetermined position (the lock position L4 in this embodiment), produces error voltage data from the calculated shift quantity, generates a capstan motor drive signal based on the error voltage data, and supplies the capstan motor drive signal to the capstan motor 34. The microcomputer 41 loads the track pair number count that is read at this time into the track pair number counter 38, and sets a shift processing flag to a value, e.g., a high level of "1", indicating that the shift processing is being carried out.

In the second process, the microcomputer 41 determines whether the track pair number count supplied from the track pair number counter 38 in the shift processing falls within a target value or not, and also whether the FG count data supplied from the FG counter 37 in the shift processing falls within a target value or not. If these values fall within the respective target values, then the microcomputer 41 clears the error voltage data, and resets the shift processing flag to a value, e.g., a low level of "0". After the error voltage data is cleared, the capstan motor drive signal energizes the capstan motor 34 to rotate at a normal speed.

In the above operation, the microcomputer 41 produces error voltage data for energizing the capstan motor 34 at a speed required to achieve a phase locked condition at a desired position, and outputs a capstan motor drive signal produced based on the error voltage data through an output port (not shown). The capstan motor drive signal outputted from the output port is supplied through the amplifier 42 to the capstan motor 34.

B. Tracking pilot signals (f0, f1, f2) (FIGS. 7A, 7B, and 7C):

FIGS. 7A, 7B, and 7C show the frequency spectrums of code strings after converted by the 24-to-25 conversion process, the views being illustrative of tracking pilot signals. In each of FIGS. 7A, 7B, and 7C, the vertical axis represents dB, and the horizontal axis the frequency. The reference characters F0, F1, F2 represent tracks F0, F1, F2, respectively, f0, f1, f2 represent frequency signals f0, f1, f2, respectively, and Pf1 and Pf2 represent tracking pilot signals.

In the example shown in FIGS. 7A, 7B, and 7C, no tracking pilot signal is generated for the track F0, the tracking pilot signal Pf1 having the frequency f1 is generated for the track F1, and the tracking pilot signal Pf2 having the frequency f2 is generated for the track F2. The track F0 has a frequency dip DIP1 of 9 dB or more, the track F1 has a frequency dip DIP2 of 3 dB or more, and the track F2 has a frequency dip DIP3 of 3 dB or more, with each of m1, m2 being in the range of from 16 to 19 dB. If fb=41.85 MHz, then the frequencies f1, f2 are given as follows:

$f1 = fb/90 = 465\ KHz,$ $f2 = fb/60 = 697\ KHz.$

The recording tracks described above are recorded on the magnetic tape 28 in the order of the successive tracks F0, F1, F2. When the track F0 is scanned by the A head 26 or the B head 27, it can detect the levels of tracking pilot signals leaking from the adjacent tracks. Therefore, it is possible to control the A head 26 or the B head 27 to scan the recording track properly by controlling the detected levels so as to be constant. Specifically, at a servo lock position, the absolute frequency difference |f0−f1|=|f0−f2| is compared with the frequency f0, and the A head 26 or the B head 27 is controlled to scan the recording track properly based on the result of comparison.

C. Relationship between a tape format and frame pulses and switching pulses (FIG. 8):

FIG. 8 shows the relationship between a tape format and frame pulses and switching pulses.

In FIG. 8, By1 represents the direction in which the A head 26r (recording), the A head 26p (playback), the B head 27r (recording), and the B head 27p (playback) scan tracks, By2 represents the direction in which the magnetic tape 28 is transported, Fp represents frame pulses supplied from an external source through the input terminal 41a (see FIG. 6), SWp represents drum switching pulses, and L1, L2, L3, L4, and L5 represent servo lock positions.

The servo lock positions referred to herein are representative of the successive playback from the respective lock positions L1, L2, L3, L4, 15 in the frame pulses from the starting tracks of respective frames on the magnetic tape 28.

In FIG. 8, f0, f1, f2 positioned over the respective recording tracks represent tracking pilot signals, numbers positioned below the respective recording tracks represent track pair numbers, A positioned in the recording tracks represents the scanning by the A head 26, and B positioned in the recording tracks represents the scanning by the B head 27. The A head 26r (B head 27r) is indicated by the thicker solids line on the A track under the track pair number "1", and the A head 26p (B head 27p) is indicated by the thicker solid lines on the A track under the track pair number "5". The following description will be given with respect to the A head 26.

The tape format shown in FIG. 8 is the NTSC format according to which one frame is composed of ten tracks (according to the PAL format, one frame is composed of twelve tracks). According to a tracking process using tracking pilot signals, for playback with the A head 26, the frequencies of the tracking pilot signals f1, f2 of adjacent tracks are compared in magnitude with each other, and a capstan motor drive signal produced on the basis of error voltage data that is obtained from the result of comparison is supplied to the capstan motor 34 to control tracking by the A head 26.

Specifically, it is determined whether the level of the tracking pilot signal f1 and the level of the tracking pilot signal f2 are equal to a reference ATF level stored in a memory 4 shown in FIG. 5, and the capstan motor 34 is FIG. 6 energized according to an error voltage that is generated on the basis of the decision results.

In this embodiment, the levels of tracking pilot signals are detected only upon playback with the A head 26. As shown in FIG. 8, the A head 26p scans tracks of the former track pair number, and the B head 27p scans tracks of the latter track pair number, so that the lock position in a frame which can be locked in phase is either one of the lock positions L1, L2, L3, L4, L5. 2.4 frames which are shown in FIG. 8 represent a period of time consumed after the A head 26 and the B head 26 scan tracks until an actual reproduced signal is outputted, i.e., a period of time required by the playback process.

In this embodiment, for outputting a reproduced signal at a desired time in synchronism with frame pulses supplied from an external source, the lock position of a head is controlled so as to be the lock position L4 in view of the 2.4 frames referred to above.

D. Apparatus for controlling the phase of a video signal according to the first embodiment of the present invention (FIG. 5):

FIG. 5 shows in block form an apparatus for controlling the phase of a video signal according to a first embodiment of the present invention.

As shown in FIG. 5, a shift processor 1 generates error voltage data for energizing the capstan motor 34 to rotate at a speed other than a standard speed (10/10-multiplied speed) from shift quantity data calculated by a shift quantity calculator 2. The shift quantity calculator 2 calculates a shift quantity based on a value indicated by track pair number data supplied from the track information detector 29 through an input terminal 11 and track pair number count data supplied from the track pair number counter 38 through an input terminal 8.

A count decision unit 3 detects whether or not the track pair number count data supplied from the track pair number counter 38 through the input terminal 8 is equal to the generated track pair number data supplied through the input terminal 11, and also whether or not the FG count data supplied from the FG counter 37 through an input terminal 7 falls within the range of reference FG count data for the A head or reference FG count data for the B head which has been read from the memory 4.

A drum controller 5 generates a drum motor drive signal based on drum switching pulses SWp supplied from the FG generator 32 through the amplifier 33 and an input terminal 9 and frame pulses Fp supplied from an external source through an input terminal 10, and supplies the generated drum motor drive signal through an output terminal 14 to the drum motor.

A capstan motor controller 18 generates a capstan motor drive signal based on the error voltage data from the shift quantity calculator 2 for energizing the capstan motor 34 to rotate at a rotational speed represented by the error voltage data, and supplies the generated capstan motor drive signal through an output terminal 13 to the capstan motor 34.

A control system 6 loads track pair number data supplied from the track information detector 29 through the input terminal 11 into the track pair number counter 38 if it detects a phase locked condition based on the detected ATF data supplied from the ATF signal detector 30 through an input terminal 12. The control system 6 also supplies the capstan motor drive signal which has been generated by the capstan motor controller 18 based on the error voltage data from the shift processor 1, through the output terminal 13 to the capstan motor 34.

While the shift processing is being carried out, the control system 6 confirms a present position based on the FG count data from the FG counter 37, and determines whether the shift processing is to be finished or not based on the count decision data from the count decision unit 3. If the shift processing is to be finished, then the control system 6 sets a shift processing flag which indicates whether the shift processing is being carried out or not in the memory 4. The process of controlling the capstan motor 34 with the control system 6 will be described later under the heading "I" with reference to FIG. 13.

The shift processor 1, the shift quantity calculator 2, the count decision unit 3, the memory 4, the drum controller 5, and the capstan motor controller 18 are connected to the control system 6. The shift processor 1, the shift quantity calculator 2, the count decision unit 3, the memory 4, the drum controller 5, the capstan motor controller 18, and the control system 6 jointly make up the microcomputer 41.

E. FG count data outputted from the FG counter in one frame (FIG. 9):

FIG. 9 shows the relationship between FG count data outputted by the FG counter 37 in one frame and tracks that constitute one frame.

In FIG. 9, t1~t10 represent recording tracks constituting one frame. A represents the scanning by the A head 26, and B represents the scanning by the B head 27. As shown in FIG. 9, within a period of time (e.g., 33 ms) corresponding to one frame, the FG counter 37 counts pulses of a capstan frequency signal from the FG generator 37, and outputs FG count data ranging from "1" to "32".

As shown in FIG. 9, counts in one frame which range from "1" to "32" are assigned respectively to the tracks in one frame, such that the first track t1 in one frame is allotted "3.2", the second track t2 "6.4", the third track t3 "9.6", the fourth track t4 "12.8", the fifth track t5 "16", the sixth track t6 "19.2", the seventh track t7 "22.4", the eighth track t8 "25.6", the ninth track t9 "28.8", and the final track t10 "32".

In this embodiment, as described above, the tracks t1, t2 are paired, the tracks t3, t4 are paired, the tracks t5, t6 are paired, the tracks t7, t8 are paired, and the tracks t9, t10 are paired. The tracks of each of these track pairs are given the same track pair number.

For track shifting, e.g., for shifting to the track t5 when the track t1 starts being scanned by the A head indicated by the thicker solid lines, the A head is controlled so as to be shifted to a track whose track pair number is "3" and which is an A track. Since the A head is shifted five tracks, it is controlled such that the FG count data from the FG counter 37 is roughly 32 waves+16 waves=48 waves per frame.

A range for track shifting from an A track to an A track is of a value between the tracks. For example, a range for track shifting to the first track t1 is "30.4"~"1.6", a range for track shifting to the third track t3 is "4.8"~"8", a range for track shifting to the fifth track t5 is "11.2"~"14.4", a range for track shifting to the seventh track t7 is "17.6"~"20.8", and a range for track shifting to the ninth track t9 is "24"~"27.2".

Converting the above values into FG count data of the FG counter 37, the range for track shifting to the first track t1 is "30"~"2", the range for track shifting to the third track t3 is "5"~"8", the range for track shifting to the fifth track t5 is "11"~"15", the range for track shifting to the seventh track t7 is "18"~"21", and the range for track shifting to the ninth track t9 is "24"~"27".

A practical value for a range for track shifting from a B track to a B track is as follow: A range for track shifting to the second track t2 is "1.6"~"4.8", a range for track shifting to the fourth track t4 is "8"~"11.2", a range for track shifting to the sixth track t6 is "14.4"~"17.6", a range for track shifting to the eighth track t8 is "20.8"~"24", and a range for track shifting to the tenth track t10 is "27.2"~"30.4".

Converting the above values into FG count data of the FG counter 37, the range for track shifting to the second track t2 is "2"~"5", the range for track shifting to the fourth track t4 is "8"~"11", the range for track shifting to the sixth track t6 is "14"~"18", the range for track shifting to the eighth track t8 is "21"~"24", and the range for track shifting to the tenth track t10 is "27"~"30".

The reference values for the use of the A head 26 will be referred to as reference FG count data for the A head, and the reference values for the use of the B head 27 will be referred to as reference FG count data for the B head. The reference FG count data for the A head and the reference FG count data for the B head are stored in the memory 4, and selected based on the track pair number data and the track pair number count data.

For example, if the track pair number data from the track information detector 29 represents "1" and the track pair number count data from the track pair number counter 38 represents "3", then track shifting is carried out to change the track pair number data from the value "1" to the value "3". A target value for the FG count data of the FG counter 37 which represents a shift quantity is in the range "11"~"15" with respect to the A head 26, and "14"~"18" with respect to the B head 27. After the track pair number data "1" is loaded into the track pair number counter 38, the value represented by the track pair number data extracted from the reproduced signal and the value represented by the track number count data outputted from the track pair number counter 38 are equal to each other.

F. Relationship between the timing of frame pulses and switching pulses and the read and write timing in a TBC (FIG. 10):

FIG. 10 shows the relationship between the timing of frame pulses and switching pulses and the read and write timing in the TBC 43b. As described above with reference to FIG. 4, the A head 26p may be locked in phase in the lock position L1, or reproduced data may not be obtained at an intended time in an editing operation or the like because the processing time in the TBC 43b is longer or shorter than the time corresponding to three tracks. FIG. 10 is illustrative of a process of eliminating the above drawbacks.

Figure 1:
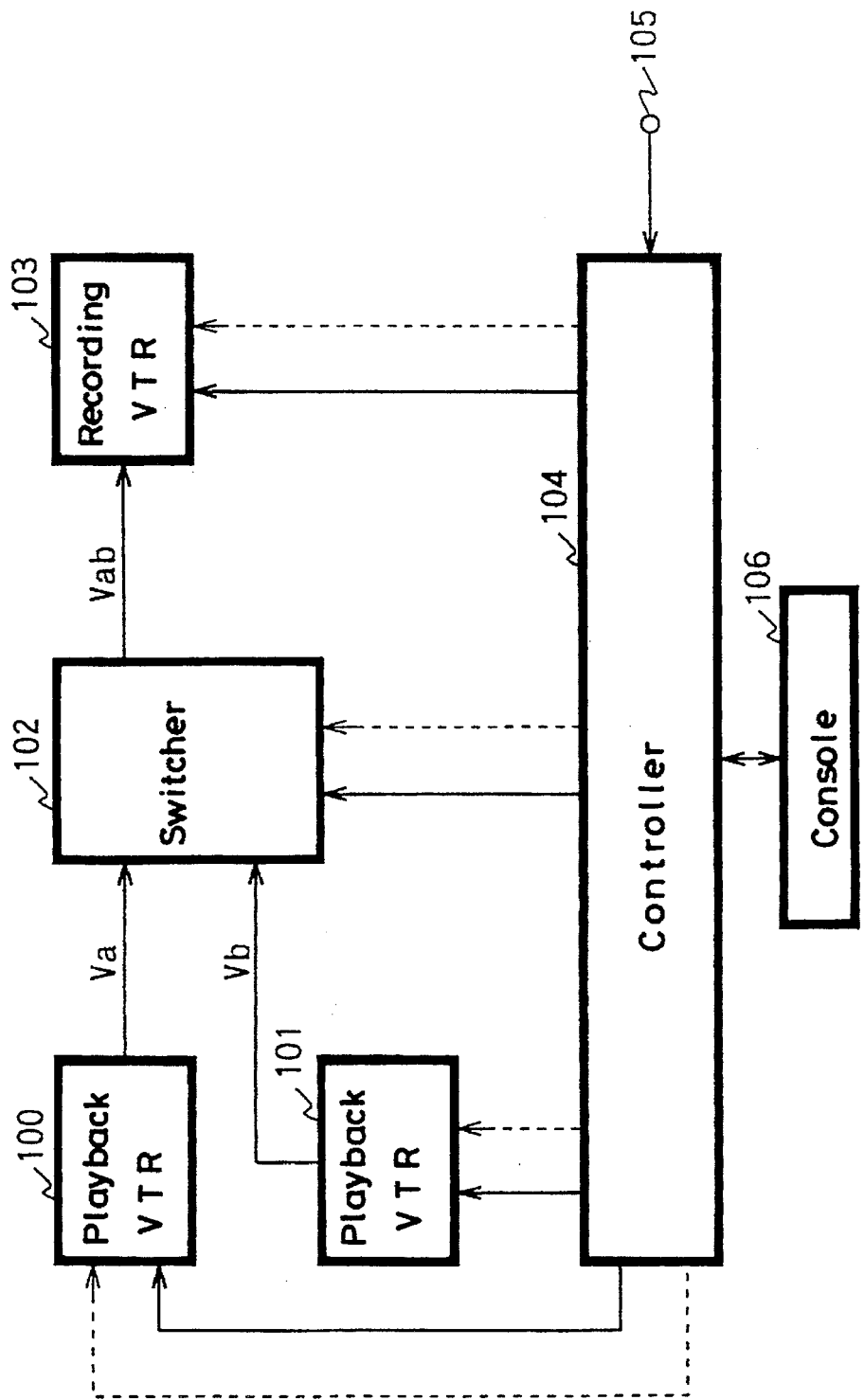
FIG. 1 is a block diagram of a conventional A/B-roll editing system.
Figure 2:
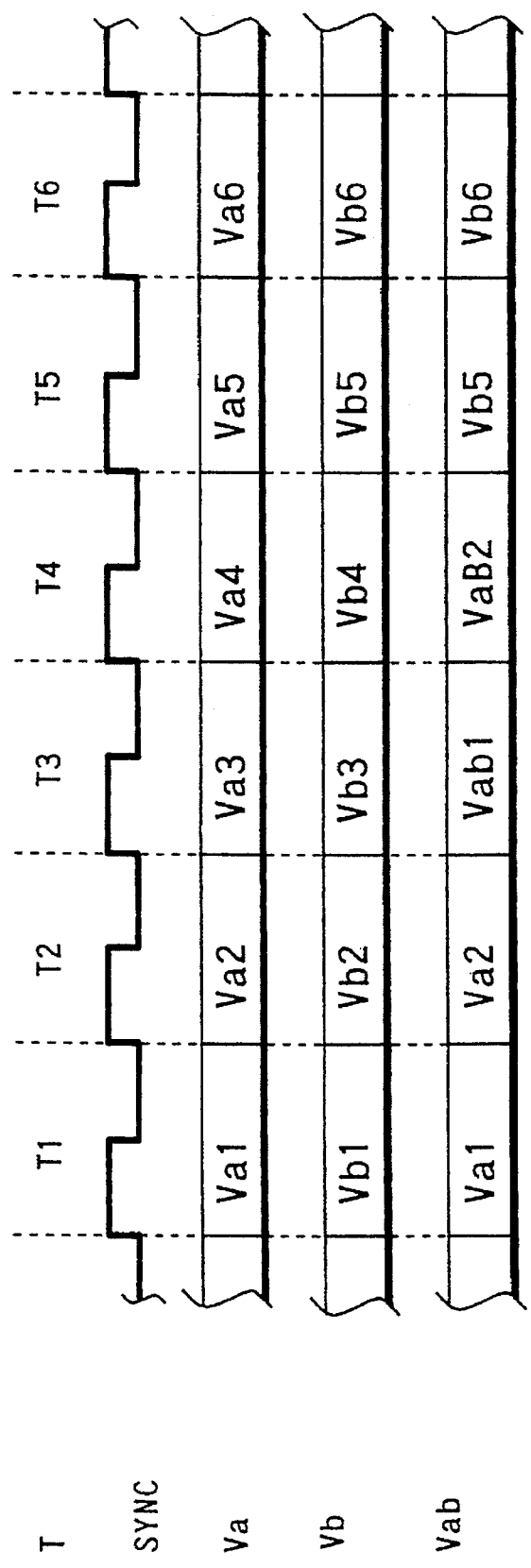
FIG. 2 is a timing chart illustrative of an A/B-roll editing process carried out by the conventional A/B-roll editing system shown in FIG. 1.
Figure 3:
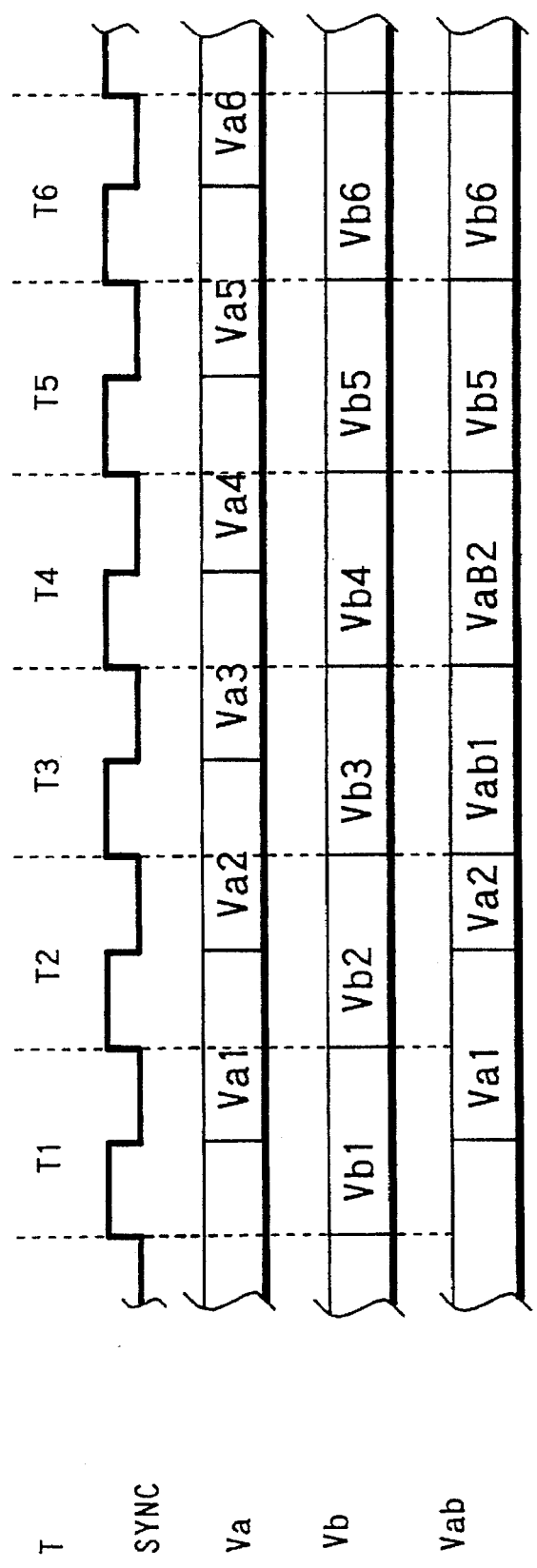
FIG. 3 is a timing chart illustrative of a drawback of the A/B-roll editing process carried out by the conventional A/B-roll editing system shown in FIG. 1.
Figure 4:
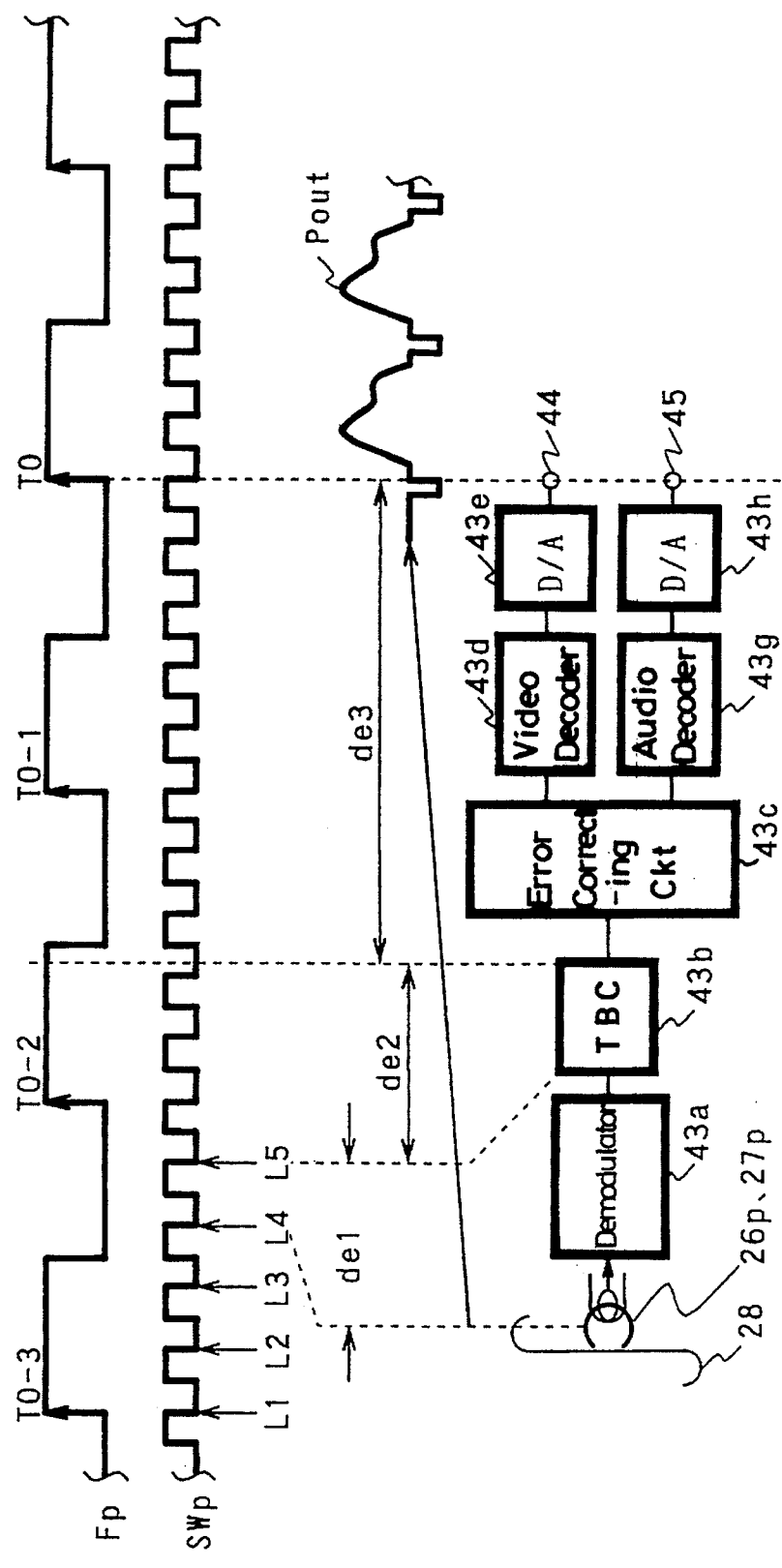
FIG. 4 is a diagram showing the relationship between the timing of frame pulses and drum switching pulses and the processing timing of a playback system.

In FIG. 10, Wp represents a write pulse for writing reproduced data in a frame memory (not shown) used in the TBC 43b shown in FIG. 4, Rp represents a read pulse for reading reproduced data written in the frame memory, x represents a period of time (fixed) from the positive-going edge of the write pulse Wp to the positive-going edge of the read pulse Rp, and di represents a time distance (playback processing time) from the A head 26p (or 27p) to a time T0 (which is also the reference playback phase).

As shown in FIG. 10, in view of the processing time de1+de3 of the playback system, in order to be able to output reproduced data at the time T0 with the A head 26p positioned as shown, i.e., spaced 2.4 frames from the time T0, the read pulse Rp may have its positive-going edge after elapse of the fixed time x from the positive-going edge of the write pulse Wp for writing data in the frame memory in the TBC 43b.

In this embodiment, the head phase is locked at the lock position L4 among the lock positions L1, L2, L3, L4, L5, i.e., the data are successively reproduced from the first track t1 in one frame at this position, and the data reproduced by the A head 26p is written at the lock position L4 with the write pulse Wp, and read with the read pulse Rp upon elapse of the time x from the time when the data starts being written with the write pulse Wp. That is, the time x from the positive-going edge of the write pulse Wp to the positive-going edge of the read pulse Rp is fixed, i.e., the processing time de2 described above with reference to FIG. 4 is fixed, and the lock position is controlled to be the lock position L4, so that even if the lock position happens to be L1, L2, L3, L5, the above control process based on the track pair number data is carried out to fix the lock position to L4 for thereby preventing disturbances of framing and time deviations.

G. Relationship between head phase lock positions and the read timing (FIG. 11):

FIG. 11 is illustrative of the phase lock positions of the A head 26p and evaluations with respect to the reference playback phase based on the read timing in the TBC 43b in the example shown in FIG. 10.

In FIG. 11, "OK" indicates that the phase of reproduced data is in the same frame as the reference playback phase (time T0) shown in FIG. 10, and "NG" indicates that the phase of reproduced data deviates from the reference playback phase, representing the reproduction of data in a preceding frame.

LP represents a lock point indicating that the lock position L1 is brought to the lock position L4 shown in FIG. 10, i.e., the lock position L4 shown in FIG. 10 is a position where the A head 26p is first locked in phase.

The read timing for the evaluation "NG" is shown in a lower portion of FIG. 11. If the read timing, such as the positive-going edge of a read pulse Rp1, is earlier than the positive-going edge of the write pulse Wp, or the read timing, such as the positive-going edge of a read pulse Rp2, is simultaneous with the positive-going edge of the write pulse Wp, then the evaluation "NG" results because the data of the preceding frame is outputted at the time T0.

Specifically, in the case where the phase lock position of the A head 26p changes from the lock position L1 to the lock position L5, when the read timing, e.g., the positive-going edge of the read pulse Rp changes from the lock position L1 to the lock position L5, the data of the preceding frame is outputted at the time T0. Since, however, the positive-going edge of the read pulse Rp is delayed the time x (fixed) from the positive-going edge of the write pulse Wp as described above with reference to FIG. 10, even when the positive-going edge of the read pulse Rp changes from the lock position L1 to the lock position L5 in the case where the phase lock position of the A head 26p changes from the lock position L1 to the lock position L5, the read pulse Rp has its positive-going edge the time x after the positive-going edge of the write pulse Wp, so that the presently reproduced data can be outputted at the time T0, with the resulting evaluation "OK".

In this embodiment, the lock position is L4 in order to output the reproduced signal in the same phase at the time T0 which is the reference playback phase, in view of the playback processing time of 2.4 frames. Therefore, if the playback processing time is of 2.6 frames, then the lock position is L3, if the playback processing time is of 2.8 frames, then the lock position is L2, and if the playback processing time is of 3.0 frames, then the lock position is L1.

H. Use of track pair number data in a reading control process (FIG. 12):

FIG. 12 shows use of track pair number data in a reading control process.

In FIG. 12, po2 represents the position of the A head 26 or the B head 27 with respect to the magnetic tape 28, po3 represents the position of the A head 26 or the B head 27 with respect to the magnetic tape 28 at the time the capstan motor 34 is accelerated to move the magnetic tape 28, and po1 represents the position of the A head 26 or the B head 27 which is locked in phase. Specifically, by carrying out the above process (to be described in detail later on with reference to the flowchart shown in FIG. 13) when the A head 26 or the B head 27 is in the position po2, the magnetic tape 28 is moved in the direction indicated by the arrow By2 to move the A head 26 or the B head 27 from the position po2 successively to the position po3 and the position po1, the relationship between the read timing in the TBC 43b and the phase lock positions is evaluated by "OK" in FIG. 11.

In this embodiment, the capstan motor 34 is accelerated to move the magnetic tape 28 for moving the A head 26 successively to the position po2 and the position po3 with respect to the magnetic tape 28, locking the A head 26 in phase at the lock position L4, i.e., the position po1. The lock position is L4 because the time after tracks start being scanned by the A head 26 or the B head 27 until reproduced data is actually outputted is equal to 2.4 frames, as described above.

I. Operation sequence of the apparatus for controlling the phase of a video signal according to the first embodiment of the present invention (FIG. 13):

FIG. 13 shows an operation sequence of the apparatus for controlling the phase of a video signal according to the first embodiment of the present invention. The operation sequence shown in FIG. 13 is carried out once in one frame.

OPERATION

Track pair number data is read in a step S1. Then, control goes to a step S2. In the step S1, track pair number data detected by the track information detector 29 is supplied to the control system 6 through the input terminal 11 shown in FIG. 5. The control system 6 stores the track pair number data supplied through the input terminal 11 into the memory 4.

The step S2 determines whether a head shift mode is selected or not. If "YES", then control goes to a step S3, and if "NO", then control ends. The step S2 determines whether a head shift is carried out or not based on the track pair number data stored in the memory 4 and the track pair number count data supplied from the track pair number counter 38. In this embodiment, since the head is locked in the lock position L4 with respect to frame pulses supplied from an external source, no track shifting is effected if the track pair number data is "4" and the track pair number count data is "4" at the time the head is locked in phase.

The step S3 determines whether shift processing is being carried out or not. If "YES", then control goes to a step S4, and if "NO", then control jumps to a step S11. In the step S3, the control system 6 shown in FIG. 5 confirms the shift processing flag stored in the memory 4, and determines whether the shift processing flag is of a value, e.g., a high level of "1", indicating that the shift processing is being carried out, or of a value, e.g., a low level of "0", indicating that the shift processing is not being carried out.

The step S4 determines whether the scanning magnetic head is the A head or not. If "YES", then control goes to a step S6, and if "NO", then control goes to a step S5. Whether the scanning magnetic head is the A head or not can be determined based on the polarity of a switching pulse.

In the step S5, a target value for the B head is established. Then, control goes to the step S6. The target value for the B head is the reference FG count data for the B head which is stored in the memory 4, and may be in either one of the ranges "2"~"5", "8"~"11", "14"~"18", "21"~"24", "27"~"30", as described above. For example, for track shifting from the value "1" indicated by the track pair number data to the value "4" indicated by the track pair number data, the reference FG count data for the B head in the range from "21"~"24" is selected.

In the step S6, a target value for the A head is established. Then, control goes to a step S7. The target value for the A head is the reference FG count data for the A head which is stored in the memory 4, and may be in either one of the ranges "30"~"2", "5"~"8", "11"~"15", "18"~"21", "24"~"27", as described above. For example, for track shifting from the value "1" indicated by the track pair number data to the value "4" indicated by the track pair number data, the reference FG count data for the A head in the range from "18"~"21" is selected.

The step S7 determines whether the count of the track pair number counter falls within the target value or not. If "YES", then control proceeds to a step S8, and if "NO", then control goes back to the step S1. In the step S7, the count decision unit 3 shown in FIG. 5 determines whether the track pair number count data supplied through the input terminal 8 and the track pair number data supplied through the input terminal 11 are equal to each other or not. If "NO", then control returns to the step S1 because the count of the track pair number counter has to fall within the target value in one frame.

The step S8 determines whether the count of the FG counter 37 falls within a target value or the like. If "YES", then control proceeds to a step S9, and if "NO", then control goes back to the step S1. In the step S8, the count decision unit 3 compares the FG count data supplied from the FG counter 37 shown in FIG. 6 through the input terminal 7 and the reference FG count data, established in the step S5 or S6, for the A head or the B head which is stored in the memory 4, thereby to determine whether the FG count data falls within a predetermined range represented by the reference FG count data.

In the step S9, the error voltage is cleared. Then, control goes to a step S10. In the step S9, the shift processor 1 clears the error voltage data stored in the memory 4.

In the step S10, the shift processing flag is reset. Thereafter, the processing shown in FIG. 13 is ended. In the step S10, the shift processor 1 resets the shift processing flag stored in the memory 4, i.e., resets the shift processing flag to a low level of "0".

If the shift processing is not being carried out in the step S3, then control jumps to the step S11. The step S11 determines whether the head is ATF locked or not. If "YES", then control proceeds to a step S12, and if "NO", then control goes back to the step S1. In the step S11, the control system 6 determines whether the head is ATF locked or not based on the detected ATF data supplied from the ATF signal detector 30 shown in FIG. 6 through the input terminal 12.

In the step S12, a shift quantity is calculated and an acceleration error voltage is established. Then, control goes to a step S13. In the step S12, the shift quantity calculator 2 calculates a shift quantity based on the track pair number data and the track pair number count data from the track pair number counter 38, obtains acceleration error voltage data (acceleration or deceleration error voltage data) based on the calculated shift quantity, and supplies the error voltage data to the control system 6. The control system 6 then stores the error voltage data into the memory 4. Based on the error voltage data read from the memory 4, the capstan motor controller 18 produces a capstan motor drive signal based on the error voltage data read from the memory 4, and supplies the capstan motor drive signal through the control system 6 and the output terminal 13 to the capstan motor 34 shown in FIG. 6. The capstan motor 34 is now energized to rotate at a rotational speed commensurate with the capstan motor drive signal that is generated based on the error voltage data, for causing the A head 26 on the magnetic head 28 to effect track shifting until the A head 26 moves to a desired track position.

In the step S13, the track pair number counter 38 is set. Then, control goes to a step S14. In the step S13, the control system 6 loads track pair number data into the track pair number counter 38 shown in FIG. 6. The track pair number counter 38 now starts counting from the value represented by the loaded track pair number data based on the count output from the FG counter 37.

In the step S14, the shift processing flag is set. Thereafter, control goes back to the step S3. In the step S14, the control system 6 supplies the error voltage data stored in the memory 4 as a drive signal through the output terminal 13 and the amplifier 42 to the capstan motor 34, and sets the shift processing flag stored in the memory 4 to a value, e.g., a high level of "1", indicating that the shift processing is being carried out.

As described above, in the absence of track shifting, the FG counter 37 may count up to "32" in one frame. Therefore, if the A head 26 is used and the lock position is L1, since the value represented by the track pair number data is "1", outputting a reproduced signal in phase with frame pulses at the time T0 may require track shifting to be carried out such that the value represented by the track pair number data in the lock position L1 is "3" and the value represented by the track pair number data in the lock position L4 is "1". Inasmuch as the target value for the FG counter 37 ranges from "30" to "2", if 10 tracks have been played back immediately prior to the lock position L4, a track can be played back where the value represented by the track pair number data is "1" at the lock position L4.

Specifically, until the lock position L4 is reached, i.e., until the value of the FG count data from the FG counter 37 becomes "30"~"2", error voltage data is determined to achieve a 16/10-multiplied speed or a 17/10-multiplied speed, a capstan motor drive signal and a drum motor drive signal are produced on the basis of the error voltage data, and the capstan motor 34 and the non-illustrated drum motor are energized by the produced drive signals. The speed corresponds to about "51" in terms of the number of pulses of a capstan motor frequency signal that is generated by the FG generator 35 in one frame. When the value of the track pair number count data from the track pair number counter 38 becomes "1" and the FG count data from the FG counter 37 becomes "30"~"2", the first track t1 in the frame is played back from the lock position L4 by resetting the error voltage data, and subsequently the tracks are played back at a 10/10-multiplied speed with the head lock position being L4. If the head lock position L4 is 2.4 frames prior to the time T0, then it is possible to output a reproduced signal in phase with the frame pulses exactly at the time T0.

For the B head 27, the error voltage data and the number of pulses of a capstan motor frequency signal generated in one frame are the same as those for the A head 26, but the target value for the FG count data differs from that for the A head 26.

According to the above embodiment, as described above, in the processing of the time base corrector in the playback signal processor 43 in a VTR, a time x from the positive-going edge of a write pulse to the positive-going edge of a read pulse is set to a fixed value in view of the time of a playback process other than the processing time in the time base corrector. Pulses of a capstan motor frequency signal generated by the FG generator 35 in response to rotation of the capstan motor 34 are counted by the FG counter 37, which produces FG count data. Track pair numbers are produced by the track pair number counter 38 which increments its count when the FG count data becomes "6" or "7". Track pair number data obtained by being reproduced when the phase is first locked is loaded into the track pair number counter 38. FG count data as shift quantity data is determined based on the track pair number count data obtained by being counted and the track pair number data obtained by being reproduced, and a capstan motor drive signal is produced from error voltage data that is obtained based on the shift quantity data. The capstan motor drive signal is supplied to the capstan motor 34 and a drum motor drive signal is supplied to the drum motor to effect a shifting process. If the count of the track pair number counter 38 falls within the target value and the count of the FG count 37 also falls within the target value, then the error voltage data supplied to the capstan motor 34 is reset. In this embodiment, for outputting a reproduced signal at the desired time T0 in synchronism with frame pulses supplied from an external source, the phase lock is achieved at the lock position L4 that precedes the desired time T0 by the time of 2.4 frames required by a playback process, and a first track of the signal to be reproduced from the lock position L4 is scanned by the A head 26. With this arrangement, even a VTR which has no CTL head is capable of preventing an asynchronous condition due to switching of video and audio signals, and of outputting a reproduced signal from a desired time in an editing process.

Since synchronization with an external synchronizing signal and processing to obtain frame accuracy in an editing process can be achieved, it is possible to effect so-called A/B roll editing, an editing process from an indicated frame, and switching between external and internal signals without causing an asynchronous condition.

SECOND EMBODIMENT

J. Time x from the positive-going edge of a read pulse to the positive-going edge of a write pulse is variable:

In the first embodiment, the time x from the positive-going edge of the write pulse Wp to the positive-going edge of the read pulse Rp is fixed. However, the time x may be variable. If the time x is variable, then the above track shifting process may be carried out in only a lock position (the lock position L5 in the first embodiment) other than the phase lock positions (the lock positions L1~L4 in the first embodiment) where the evaluation "OK" is obtained by adjusting the time x.

THIRD EMBODIMENT

K. Phase control is effected upon recording:

In the first embodiment, phase control is effected upon playback. However, phase control may be carried out upon recording. For phase control to be carried out upon recording, as with the arrangement shown in FIG. 4, the recording signal processor 22 comprises an A/D converter, a TBC, a video coding circuit and an audio coding circuit, an error correction code adding circuit, a modulator, and recording heads 26r, 27r.

The processing time spent by the A/D converter, the TBC, the video coding circuit and the audio coding circuit, and the error correction code adding circuit is the processing time de3 shown in FIG. 4, the time from the inputting of data to the modulator until the outputting of data to the recording heads 26r, 27r is the processing time de1 shown in FIG. 4, and the processing time in the TBC is de2.

Phase control effected upon recording in the same manner as upon playback allows signals to be reliably recorded at the time T0 (which is recording reference phase in this embodiment).

FOURTH EMBODIMENT

Brief Description of the Fourth Embodiment

According to the fourth embodiment, in the processing of a time base corrector in a playback signal processor 43 in a VTR, a time x from the positive-going edge of a write pulse to the positive-going edge of a read pulse is set to a fixed value in view of the time of a playback process other than the processing time in the time base corrector. Pulses of a capstan motor frequency signal generated by an FG generator 35 in response to rotation of a capstan motor 34 are counted by an FG counter 37, which produces FG count data. Track numbers are produced by a track number counter which increments its count with "3" of the FG count data for four times from the start and then increments its count with "4" of the FG count data. Track number data obtained by being reproduced when the phase is first locked is loaded into the track number counter. FG count data as a target value, i.e., shift quantity data, is determined based on the track number count data obtained by being counted and the track number data obtained by being reproduced, and a capstan motor drive signal is produced from error voltage data that is obtained based on the shift quantity data. The capstan motor drive signal is supplied to the capstan motor 34 to effect a shifting process. If the count of the track number counter falls within the target value and the count of the FG count 37 also falls within the target value, then the error voltage data supplied to the capstan motor 34 is reset to supply a capstan motor drive signal for transporting the magnetic tape at a 10/10-multiplied speed to the capstan motor 34 for thereby setting the rotational speed of the capstan motor 34 to a normal rotational speed.

In this embodiment, for outputting a reproduced signal at a desired time T0 in synchronism with frame pulses supplied from an external source, the above process is carried out in order to achieve the phase lock at a lock position L4 that precedes the desired time T0 by the time of 2.4 frames required by a playback process, and a first track of the signal to be reproduced from the lock position L4 is scanned by the A head 26 for thereby outputting the reproduced signal in phase with the frame pulses at the desired time T0. With this arrangement, even a VTR which has no CTL head is capable of preventing an asynchronous condition due to switching of video and audio signals in an A/B roll editing process, for example, and of outputting a reproduced signal from a desired time in an editing process.

To accomplish the above operation and advantages, according to the fourth embodiment, the track pair number counter 38 shown in FIG. 6 comprises a track number counter for counting "3" or "4" of the FG count data supplied from the FG counter 37 to produce track number data. Upon recording, track number data is recorded in ID data for each track, and the track information detector 29 detects the track number data. Therefore, the input terminal 8 shown in FIG. 5 is supplied with track number count data, and the input terminal 11 is supplied with the track number data. Stated otherwise, the track pair number data in the first embodiment is replaced with the track number data, and the processing based on the track number data is carried out.

L. Relationship between a tape format and frame pulses and switching pulses (FIG. 14):

FIG. 14 shows the relationship between a tape format using track numbers and frame pulses and switching pulses.

In FIG. 14, By1 represents the direction in which the A head 26r (recording), the A head 26p (playback), the B head 27r (recording), and the B head 27p (playback) scan tracks, By2 represents the direction in which the magnetic tape 28 is transported, Fp represents frame pulses supplied from an external source through the input terminal 41a (see FIG. 6), SWp represents drum switching pulses, and L1, L2, L3, L4, and L5 represent servo lock positions.

The servo lock positions referred to herein are representative of the successive playback from the respective lock positions L1, L2, L3, L4, l5 in the frame pulses from the starting tracks of respective frames on the magnetic tape 28.

In FIG. 14, f0, f1, f2 positioned over the respective recording tracks represent tracking pilot signals, numbers positioned below the respective recording tracks represent track numbers, A positioned in the recording tracks represents the scanning by the A head 26, and B positioned in the recording tracks represents the scanning by the B head 27. The A head 26r (B head 27r) is indicated by the thicker solids line on the A track under the track number "1", and the A head 26p (B head 27p) is indicated by the thicker solid lines on the A track under the track number "5". The following description will be given with respect to the A head 26.

The tape format shown in FIG. 14 is the NTSC format according to which one frame is composed of ten tracks (according to the PAL format, one frame is composed of twelve tracks). According to a tracking process using tracking pilot signals, for playback with the A head 26, the frequencies of the tracking pilot signals f1, f2 of adjacent tracks are compared in magnitude with each other, and a capstan motor drive signal produced on the basis of error voltage data that is obtained from the result of comparison is supplied to the capstan motor 34 to control tracking by the A head 26.

Specifically, it is determined whether the level of the tracking pilot signal f1 and the level of the tracking pilot signal f2 are equal to a reference ATF level stored in a memory 8 shown in FIG. 5, and the capstan motor 34 is energized according to an error voltage that is generated on the basis of the decision results.

In this embodiment, the levels of tracking pilot signals are detected only upon playback with the A head 26. As shown in FIG. 14, the A head 26p scans tracks of odd-numbered track numbers, and the B head 27p scans tracks of even-numbered track numbers, so that the lock position in a frame which can be locked in phase is either one of the lock positions L1, L2, L3, L4, L5. 2.4 frames which are shown in FIG. 8 represent a period of time consumed after the A head 26 and the B head 26 scan tracks until an actual reproduced signal is outputted, i.e., a period of time required by the playback process.

In this embodiment, for outputting a reproduced signal at a desired time in synchronism with frame pulses supplied from an external source, the lock position of a head is controlled so as to be the lock position L4 in view of the 2.4 frames referred to above.

Figure 15:
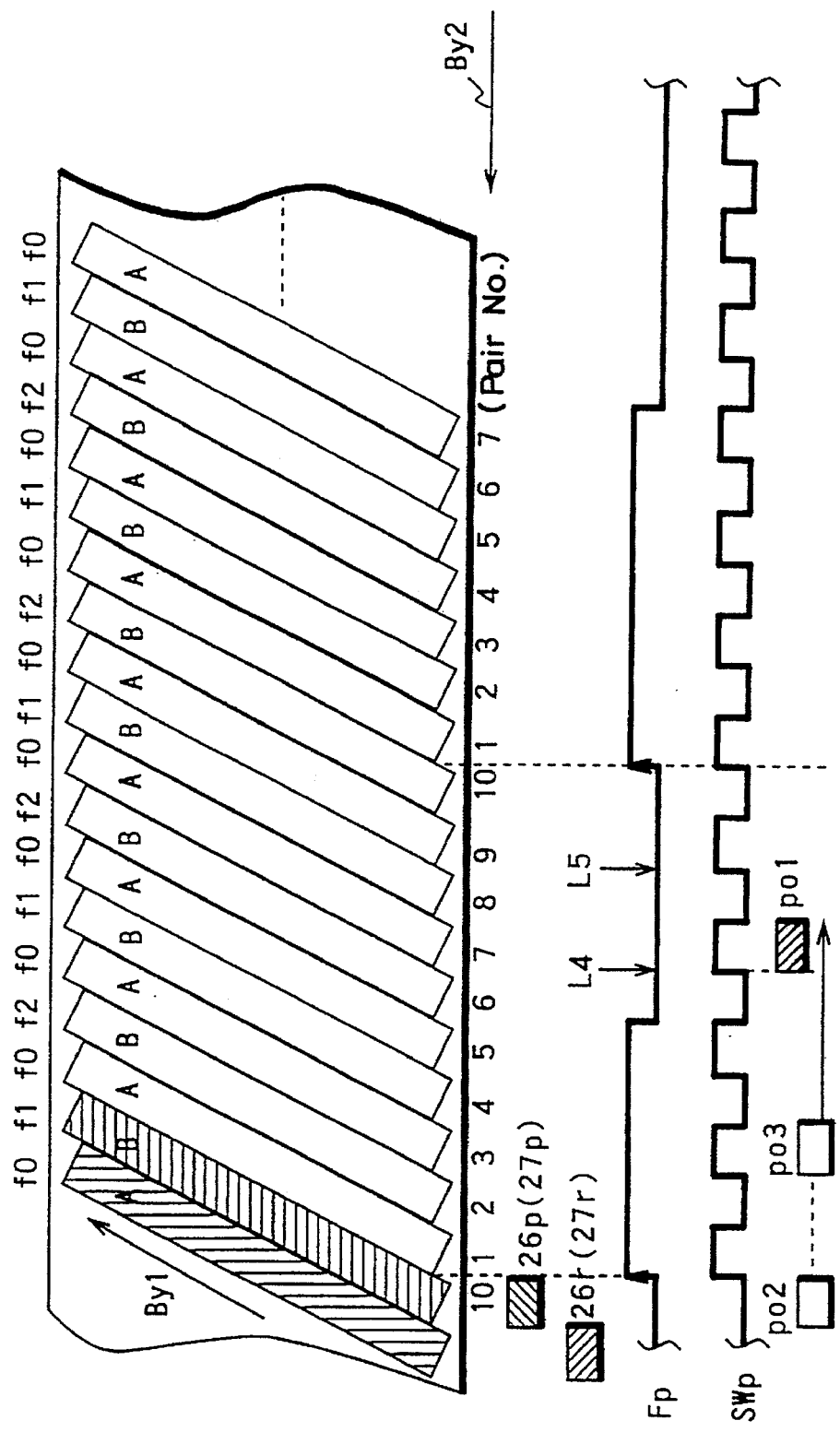
FIG. 15 is a diagram illustrative of use of track number data in a reading control process in the apparatus for controlling the phase of a video signal according to the fourth embodiment of the present invention.

M. Relationship between the phase lock of a head and the read timing (FIG. 15):

FIG. 15 shows use of track number data in a reading control process.

In FIG. 15, po2 represents the position of the A head 26 or the B head 27 with respect to the magnetic tape 28, po3 represents the position of the A head 26 or the B head 27 with respect to the magnetic tape 28 at the time the capstan motor 34 is accelerated to move the magnetic tape 28, and po1 represents the position of the A head 26 or the B head 27 which is locked in phase. Specifically, by carrying out the above process (to be described in detail later on with reference to the flowchart shown in FIG. 13) when the A head 26 or the B head 27 is in the position po2, the magnetic tape 28 is moved in the direction indicated by the arrow By2 to move the A head 26 or the B head 27 from the position po2 successively to the position po3 and the position po1, the relationship between the read timing in the TBC 43b and the phase lock positions is evaluated by "OK" in FIG. 11.

In this embodiment, the capstan motor 34 is accelerated to move the magnetic tape 28 for moving the A head 26 successively to the position po2 and the position po3 with respect to the magnetic tape 28, locking the A head 26 in phase at the lock position L4, i.e., the position po1. The lock position is L4 because the time after tracks start being scanned by the A head 26 or the B head 27 until reproduced data is actually outputted is equal to 2.4 frames, as described above.

N. Operation sequence of the apparatus for controlling the phase of a video signal according to the fourth embodiment of the present invention (FIG. 16):

FIG. 16 shows an operation sequence of the apparatus for controlling the phase of a video signal according to the fourth embodiment of the present invention. The operation sequence shown in FIG. 16 is carried out once in one frame.

OPERATION

Track number data is read in a step S21. Then, control goes to a step S22. In the step S21, track number data detected by the track information detector 29 is supplied to the control system 6 through the input terminal 11 shown in FIG. 5. The control system 6 stores the track number data supplied through the input terminal 11 into the memory 4.

The step S22 determines whether a head shift mode is selected or not. If "YES", then control goes to a step S23, and if "NO", then control ends. The step S22 determines whether head shifting is carried out or not based on the track number data stored in the memory 4 and the track number count data supplied from the track number counter. In this embodiment, since the head is locked in the lock position L4 with respect to frame pulses supplied from an external source, no track shifting is effected if the track pair number data is "7" and the track number count data is "7" at the time the head is locked in phase.

The step S23 determines whether shift processing is being carried out or not. If "YES", then control goes to a step S24, and if "NO", then control jumps to a step S31. In the step S23, the control system 6 shown in FIG. 5 confirms the shift processing flag stored in the memory 4, and determines whether the shift processing flag is of a value, e.g., a high level of "1", indicating that the shift processing is being carried out, or of a value, e.g., a low level of "0", indicating that the shift processing is not being carried out.

The step S24 determines whether the scanning magnetic head is the A head or not. If "YES", then control goes to a step S26, and if "NO", then control goes to a step S25. Whether the scanning magnetic head is the A head or not can be determined based on the polarity of a switching pulse.

In the step S25, a target value for the B head is established. Then, control goes to the step S26. The target value for the B head is the reference FG count data for the B head which is stored in the memory 4, and may be in either one of the ranges "2"~"5", "8"~"11", "14"~"18", "21"~"24", "27"~"30", as described above. For example, for track shifting from the value "1" indicated by the track number data to the value "8" indicated by the track number data, the reference FG count data for the B head in the range from "21"~"24" is selected.

In the step S26, a target value for the A head is established. Then, control goes to a step S27. The target value for the A head is the reference FG count data for the A head which is stored in the memory 4, and may be in either one of the ranges "30"~"2", "5"~"8", "11"~"15", "18"~"21", "24"~"27", as described above. For example, for track shifting from the value "1" indicated by the track number data to the value "7" indicated by the track number data, the reference FG count data for the A head in the range from "18"~"21" is selected.

The step S27 determines whether the count of the track number counter falls within the target value or not. If "YES", then control proceeds to a step S28, and if "NO", then control goes back to the step S21. In the step S27, the count decision unit 3 shown in FIG. 5 determines whether the track number count data supplied through the input terminal 8 and the track number data supplied through the input terminal 11 are equal to each other or not. If "NO", then control returns to the step S21 because the count of the track number counter has to fall within the target value in one frame.

The step S28 determines whether the count of the FG counter 37 falls within a target value or the like. If "YES", then control proceeds to a step S29, and if "NO", then control goes back to the step S21. In the step S28, the count decision unit 3 compares the FG count data supplied from the FG counter 37 shown in FIG. 6 through the input terminal 7 and the reference FG count data, established in the step S25 or S26, for the A head or the B head which is stored in the memory 4, thereby to determine whether the FG count data falls within a predetermined range represented by the reference FG count data.

In the step S29, the error voltage is cleared. Then, control goes to a step S30. In the step S29, the shift processor 1 clears the error voltage data stored in the memory 4.

In the step S30, the shift processing flag is reset. Thereafter, the processing shown in FIG. 16 is ended. In the step S30, the shift processor 1 resets the shift processing flag stored in the memory 4, i.e., resets the shift processing flag to a low level of "0".

If the shift processing is not being carried out in the step S23, then control jumps to the step S31. The step S31 determines whether the head is ATF locked or not. If "YES", then control proceeds to a step S32, and if "NO", then control goes back to the step S21. In the step S31, the control system 6 determines whether the head is ATF locked or not based on the detected ATF data supplied from the ATF signal detector 30 shown in FIG. 6 through the input terminal 12.

In the step S32, a shift quantity is calculated and an acceleration error voltage is established. Then, control goes to a step S33. In the step S32, the shift quantity calculator 2 calculates a shift quantity based on the track number data and the track number count data from the track number counter, obtains acceleration error voltage data (acceleration or deceleration error voltage data) based on the calculated shift quantity, and supplies the error voltage data to the control system 6. The control system 6 then stores the error voltage data into the memory 4. Based on the error voltage data read from the memory 4, the capstan motor controller 18 produces a capstan motor drive signal based on the error voltage data read from the memory 4, and supplies the capstan motor drive signal through the control system 6 and the output terminal 13 to the capstan motor 34 shown in FIG. 6. The capstan motor 34 is now energized to rotate at a rotational speed commensurate with the capstan motor drive signal that is generated based on the error voltage data, for causing the A head 26 on the magnetic head 28 to effect track shifting until the A head 26 moves to a desired track position.

In the step S33, the track number counter is set. Then, control goes to a step S34. In the step S33, the control system 6 loads track number data into the track number counter. The track number counter now starts counting from the value represented by the loaded track number data based on the count output from the FG counter 37.

In the step S34, the shift processing flag is set. Thereafter, control goes back to the step 23. In the step S34, the control system 6 supplies the error voltage data stored in the memory 4 as a drive signal through the output terminal 13 and the amplifier 42 to the capstan motor 34, and sets the shift processing flag stored in the memory 4 to a value, e.g., a high level of "1", indicating that the shift processing is being carried out.

As described above, in the absence of track shifting, the FG counter 37 may count up to "32" in one frame. Therefore, if the A head 26 is used and the lock position is L1, since the value represented by the track number data is "1", outputting a reproduced signal in phase with frame pulses at the time T0 may require track shifting to be carried out such that the value represented by the track number data in the lock position L1 is "5" and the value represented by the track number data in the lock position L4 is "1". Inasmuch as the target value for the FG counter 37 ranges from "30" to "2", if 10 tracks have been played back immediately prior to the lock position L4, a track can be played back where the value represented by the track number data is "1" at the lock position L4.

Specifically, until the lock position L4 is reached, i.e., until the value of the FG count data from the FG counter 37 becomes "30"~"2", error voltage data is determined to achieve a 16/10-multiplied speed or a 17/10-multiplied speed, a capstan motor drive signal and a drum motor drive signal are produced on the basis of the error voltage data, and the capstan motor 34 and the non-illustrated drum motor are energized by the produced drive signals. The speed corresponds to about "51" in terms of the number of pulses of a capstan motor frequency signal that is generated by the FG generator 35 in one frame. When the value of the track number count data from the track number counter becomes "1" and the FG count data from the FG counter 37 becomes "30"~"2", the first track t1 in the frame is played back from the lock position L4 by resetting the error voltage data, and subsequently the tracks are played back at a 10/10-multiplied speed with the head lock position being L4. If the head lock position L4 is 2.4 frames prior to the time T0, then it is possible to output a reproduced signal in phase with the frame pulses exactly at the time T0.

For the B head 27, the error voltage data and the number of pulses of a capstan motor frequency signal generated in one frame are the same as those for the A head 26, but the target value for the FG count data differs from that for the A head 26.

In this embodiment, in the processing of the time base corrector in the playback signal processor 43 in a VTR, the time x from the positive-going edge of a write pulse to the positive-going edge of a read pulse is set to a fixed value in view of the time of a playback process other than the processing time in the time base corrector. Pulses of a capstan motor frequency signal generated by the FG generator 35 in response to rotation of the capstan motor 34 are counted by the FG counter 37, which produces FG count data. Track numbers are produced by the track number counter which increments its count with "3" of the FG count data for four times from the start and then increments its count with "4" of the FG count data. Track number data obtained by being reproduced when the phase is first locked is loaded into the track number counter. FG count data as a target value, i.e., shift quantity data, is determined based on the track number count data obtained by being counted and the track number data obtained by being reproduced, and a capstan motor drive signal is produced from error voltage data that is obtained based on the shift quantity data. The capstan motor drive signal is supplied to the capstan motor 34 to effect a shifting process. If the count of the track number counter falls within the target value and the count of the FG count 37 also falls within the target value, then the error voltage data supplied to the capstan motor 34 is reset to supply a capstan motor drive signal for transporting the magnetic tape at a 10/10-multiplied speed to the capstan motor 34 for thereby setting the rotational speed of the capstan motor 34 to a normal rotational speed. For outputting a reproduced signal at a desired time T0 in synchronism with frame pulses supplied from an external source, the above process is carried out in order to achieve the phase lock at the lock position L4 that precedes the desired time T0 by the time of 2.4 frames required by a playback process, and a first track of the signal to be reproduced from the lock position L4 is scanned by the A head 26 for thereby outputting the reproduced signal in phase with the frame pulses at the desired time T0. With this arrangement, even a VTR which has no CTL head is capable of preventing an asynchronous condition due to switching of video and audio signals, and of outputting a reproduced signal from a desired time in an editing process.

With the arrangement of the present invention, there is provided a method of controlling the phase of a video signal in a playback apparatus or a recording/playback apparatus for reproducing a signal recorded on a magnetic tape with a rotary head and effecting a playback process on the reproduced signal, comprising the steps of counting pulses of a capstan motor frequency signal from a frequency generator which outputs a frequency signal depending on the rotation of a capstan motor for transporting the magnetic tape, in every N tracks, for producing group count data representing a count of groups each composed of N tracks, extracting group number data allotted to every N tracks from a reproduced signal which is produced when the signal recorded on the magnetic tape is reproduced by the rotary head when the rotary head is locked in phase with a reference signal, producing shift quantity data representative of a shift quantity by which the rotary head is to be shifted to a target phase lock position with respect to the magnetic tape, based on a value indicated by the group count data and a value indicated by the group number data, generating a capstan motor drive signal for energizing the capstan motor to rotate at a speed depending on a value indicated by the shift quantity data, supplying the capstan motor drive signal to the capstan motor and detecting whether the number of pulses of the capstan motor frequency signal from the frequency generator falls within a target value or not, and supplying a capstan motor frequency signal representing a standard speed to the capstan motor if the number of pulses of the capstan motor frequency signal falls within the target value. The capstan motor is energized to rotate at the speed depending on the shift quantity based on the group number data and the group count data which are obtained at the time of phase lock, and a target lock position is achieved when the count of pulses of the capstan motor frequency signal falls within the target value. After the target lock position is reached, the capstan motor is energized to rotate at a normal speed. Therefore, the rotary head can be locked in phase at the target lock position. Since the rotary head can be locked in phase at a desired position with respect to a reference signal supplied from an external source, it is possible to perform an editing process with frame accuracy. Because framing can be achieved by locking the phase, an asynchronous condition can be prevented upon switching between internal and external signals in a so-called A/B roll editing process or the like.

If a time base correction process is effected in the playback process in the above arrangement, then the reproduced signal stored in the memory starts being read after elapse of a period of time from the time when the reproduced signal starts being written into a memory used in the time base correction process to the time when the reproduced signal written in the memory starts, the period of time being set to a fixed value in view of the time required by the playback process. By reading the reproduced signal after elapse of the fixed period of time set in view of the time required by the playback process from the time when the reproduced signal starts being written for effecting the time base correction process, the data of a preceding frame is not outputted, and hence accuracy in an editing process or the like is increased.

Alternatively, if a time base correction process is effected in the playback process in the above arrangement, then the reproduced signal stored in the memory starts being read after elapse of a period of time from the time when the reproduced signal starts being written into a memory used in the time base correction process to the time when the reproduced signal written in the memory starts being read, the period of time being set to a variable value in view of the time required by the playback process. By reading the reproduced signal after elapse of the variable period of time set in view of the time required by the playback process from the time when the reproduced signal starts being written for effecting the time base correction process, the data of a preceding frame is not outputted, and it is possible to select a control process based on only the setting of the time or a control process based on both the setting of the time and shift processing, allowing the data of a desired frame to be outputted at a desired time. Consequently, accuracy in an editing process or the like is increased, and the selective processing permits a control process optimum for the present to be carried out.

Furthermore, there is also provided a method of controlling the phase of a video signal in a playback apparatus or a recording/playback apparatus for reproducing a signal recorded on a magnetic tape with a rotary head and effecting a playback process on the reproduced signal, comprising the steps of counting pulses of a capstan motor frequency signal from a frequency generator which outputs a frequency signal depending on the rotation of a capstan motor for transporting the magnetic tape, for producing track count data, extracting track number data allotted to every track from a reproduced signal which is produced when the signal recorded on the magnetic tape is reproduced by the rotary head when the rotary head is locked in phase with a reference signal, producing shift quantity data representative of a shift quantity by which the rotary head is to be shifted to a target phase lock position with respect to the magnetic tape, based on a value indicated by the track count data and a value indicated by the track number data, generating a capstan motor drive signal for energizing the capstan motor to rotate at a speed depending on a value indicated by the shift quantity data, supplying the capstan motor drive signal to the capstan motor and detecting whether the number of pulses of the capstan motor frequency signal from the frequency generator falls within a target value or not, and supplying a capstan motor frequency signal representing a standard speed to the capstan motor if the number of pulses of the capstan motor frequency signal falls within the target value. The capstan motor is energized to rotate at the speed depending on the shift quantity based on the track number data and the track count data which are obtained at the time of phase lock, and a target lock position is achieved when the count of pulses of the capstan motor frequency signal falls within the target value. After the target lock position is reached, the capstan motor is energized to rotate at a normal speed. Therefore, the rotary head can be locked in phase at the target lock position. Since the rotary head can be locked in phase at a desired position with respect to a reference signal supplied from an external source, it is possible to perform an editing process with frame accuracy. Because framing can be achieved by locking the phase, an asynchronous condition can be prevented upon switching between internal and external signals in a so-called A/B roll editing process or the like.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A method of controlling the phase of a video signal in a playback apparatus or a recording/playback apparatus for reproducing a signal recorded on a magnetic tape with a rotary head and effecting a playback process on the reproduced signal, comprising the steps of:

counting pulses of a capstan motor frequency signal from a frequency generator which outputs a frequency signal depending on the rotation of a capstan motor for transporting the magnetic tape, in every N tracks, for producing group count data representing a count of groups each composed of N tracks;

extracting group number data allotted to every N tracks from a reproduced signal which is produced when the signal recorded on the magnetic tape is reproduced by the rotary head when the rotary head is locked in phase with a reference signal;

producing shift quantity data representative of a shift quantity by which the rotary head is to be shifted to a target phase lock position with respect to the magnetic tape, based on a value indicated by said group count data and a value indicated by said group number data;

generating a capstan motor drive signal for energizing the capstan motor to rotate at a speed depending on a value indicated by the shift quantity data;

supplying the capstan motor drive signal to the capstan motor and detecting whether the number of pulses of the capstan motor frequency signal from the frequency generator falls within a target value or not; and supplying a capstan motor frequency signal representing a standard speed to the capstan motor if the number of pulses of the capstan motor frequency signal falls within the target value.

2. A method according to claim 1, wherein the playback process effects a time base correction process and a period of time from the time when the reproduced signal starts being written into a memory used in the time base correction process to the time when the reproduced signal written in the memory starts being read is set to a fixed value in view of the time required by the playback process.

3. A method according to claim 1, wherein the playback process effects a time base correction process and a period of time from the time when the reproduced signal starts being written into a memory used in the time base correction process to the time when the reproduced signal written in the memory starts being read is set to a variable value in view of the time required by the playback process.

4. An apparatus for controlling the phase of a video signal in a playback apparatus or a recording/playback apparatus for transporting a magnetic tape with a capstan, reproducing a signal recorded on the magnetic tape with a rotary head, and effecting a playback process on the reproduced signal, comprising:

track information detecting means for extracting group number data allotted to every N tracks from a reproduced signal when the rotary head is locked in phase with a reference signal;

frequency generating means for generating a capstan motor frequency signal depending on the rotation of a capstan motor for rotating the capstan;

counting means for counting pulses of a capstan motor frequency signal from said frequency generating means in every N tracks, for producing group count data representing a count of groups each composed of N tracks;

capstan motor control means for producing shift quantity data representative of a shift quantity by which the rotary head is to be shifted to a target phase lock position with respect to the magnetic tape, based on a value indicated by said group number data from said track information detecting means and a value indicated by said group count data from said counting means, and generating a capstan motor drive signal for energizing the capstan motor to rotate at a speed depending on a value indicated by the shift quantity data;

detecting means for detecting whether the number of pulses of the capstan motor frequency signal from said frequency generating means falls within a target value or not while said capstan motor is being driven at the speed based on said shift quantity data by said capstan motor control means; and control means for supplying a capstan motor frequency signal representing a standard speed to said capstan motor control means if the number of pulses of the capstan motor frequency signal falls within the target value.

5. An apparatus according to claim 4, wherein said control means comprises means for, when a time base correction process is effected in the playback process, setting a period of time from the time when the reproduced signal starts being written into a memory used in the time base correction process to the time when the reproduced signal written in the memory starts being read, to a fixed value in view of the time required by the playback process.

6. An apparatus according to claim 4, wherein said control means comprises means for, when a time base correction process is effected in the playback process, setting a period of time from the time when the reproduced signal starts being written into a memory used in the time base correction process to the time when the reproduced signal written in the memory starts being read, to a variable value in view of the time required by the playback process.

7. A method of controlling the phase of a video signal in a playback apparatus or a recording/playback apparatus for reproducing a signal recorded on a magnetic tape with a rotary head and effecting a playback process on the reproduced signal, comprising the steps of:

counting pulses of a capstan motor frequency signal from a frequency generator which outputs a frequency signal depending on the rotation of a capstan motor for transporting the magnetic tape, for producing track count data;

extracting track number data allotted to every track from a reproduced signal which is produced when the signal recorded on the magnetic tape is reproduced by the rotary head when the rotary head is locked in phase with a reference signal;

producing shift quantity data representative of a shift quantity by which the rotary head is to be shifted to a target phase lock position with respect to the magnetic tape, based on a value indicated by said track count data and a value indicated by said track number data;

generating a capstan motor drive signal for energizing the capstan motor to rotate at a speed depending on a value indicated by the shift quantity data;

supplying the capstan motor drive signal to the capstan motor and detecting whether the number of pulses of the capstan motor frequency signal from the frequency generator falls within a target value or not; and supplying a capstan motor frequency signal representing a standard speed to the capstan motor if the number of pulses of the capstan motor frequency signal falls within the target value.

8. A method according to claim 7, wherein when a time base correction process is effected in the playback process, then a period of time from the time when the reproduced signal starts being written into a memory used in the time base correction process to the time when the reproduced signal written in the memory starts being read is set to a fixed value in view of the time required by the playback process.

9. A method according to claim 7, wherein when a time base correction process is effected in the playback process, then a period of time from the time when the reproduced signal starts being written into a memory used in the time base correction process to the time when the reproduced signal written in the memory starts being read is set to a variable value in view of the time required by the playback process.

10. An apparatus for controlling the phase of a video signal in a playback apparatus or a recording/playback apparatus for transporting a magnetic tape with a capstan, reproducing a signal recorded on the magnetic tape with a rotary head, and effecting a playback process on the reproduced signal, comprising:

track information detecting means for extracting track number data allotted to every track from a reproduced signal when the rotary head is locked in phase with a reference signal;

frequency generating means for generating a capstan motor frequency signal depending on the rotation of a capstan motor for rotating the capstan;

counting means for counting pulses of a capstan motor frequency signal from said frequency generating means, for producing track count data;

capstan motor control means for producing shift quantity data representative of a shift quantity by which the rotary head is to be shifted to a target phase lock position with respect to the magnetic tape, based on a value indicated by said track number data from said track information detecting means and a value indicated by said track count data from said counting means, and generating a capstan motor drive signal for energizing the capstan motor to rotate at a speed depending on a value indicated by the shift quantity data;

detecting means for detecting whether the number of pulses of the capstan motor frequency signal from said frequency generating means falls within a target value or not while said capstan motor is being driven at the speed based on said shift quantity data by said capstan motor control means; and control means for supplying a capstan motor frequency signal representing a standard speed to said capstan motor control means if the number of pulses of the capstan motor frequency signal falls within the target value.

11. An apparatus according to claim 10, wherein said control means comprises means for, when a time base correction process is effected in the playback process, setting a period of time from the time when the reproduced signal starts being written into a memory used in the time base correction process to the time when the reproduced signal written in the memory starts being read, to a fixed value in view of the time required by the playback process.

12. An apparatus according to claim 10, wherein said control means comprises means for, when a time base correction process is effected in the playback process, setting a period of time from the time when the reproduced signal starts being written into a memory used in the time base correction process to the time when the reproduced signal written in the memory starts being read, to a variable value in view of the time required by the playback process.

* * * * *